(12) United States Patent
He

(10) Patent No.: US 10,348,864 B2
(45) Date of Patent: Jul. 9, 2019

(54) INFORMATION TRANSFER METHOD, CLIENT, AND SERVER

(71) Applicants: Huawei Technologies Co., Ltd., Shenzhen, Guangdong, P.R. (CN); Jin He, Shenzhen, Guangdong, P.R. (CN)

(72) Inventor: Jin He, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 272 days.

(21) Appl. No.: 15/515,117

(22) PCT Filed: Sep. 29, 2014

(86) PCT No.: PCT/CN2014/087806
§ 371 (c)(1),
(2) Date: Mar. 28, 2017

(87) PCT Pub. No.: WO2016/049816
PCT Pub. Date: Apr. 7, 2016

(65) Prior Publication Data
US 2017/0214772 A1   Jul. 27, 2017

(51) Int. Cl.
*G06F 15/16* (2006.01)
*H04L 29/06* (2006.01)
(Continued)

(52) U.S. Cl.
CPC .............. *H04L 67/42* (2013.01); *G06F 16/34* (2019.01); *G06F 16/9577* (2019.01); *H04L 51/32* (2013.01); *H04L 67/22* (2013.01)

(58) Field of Classification Search
None
See application file for complete search history.

(56) References Cited

U.S. PATENT DOCUMENTS

| 7,561,722 B2 | 7/2009 | Harrington |
|---|---|---|
| 2007/0133842 A1 | 6/2007 | Harrington |

(Continued)

FOREIGN PATENT DOCUMENTS

| CN | 101271470 A | 9/2008 |
|---|---|---|
| CN | 101483696 A | 7/2009 |

(Continued)

*Primary Examiner* — Dhairya A Patel

(57) ABSTRACT

An information transfer method, includes: receiving N pieces of information and N pieces of corresponding identification information sent by a server according to a data obtaining request; obtaining attribute information of at least two pieces of information in the N pieces of information, where the attribute information includes at least one of the following attributes of the at least two pieces of information: content separability or location adjustability; generating to-be-posted information according to the attribute information of the at least two pieces of information and an operation instruction of a user for the at least two pieces of information; and determining identification information corresponding to the to-be-posted information and second indication information corresponding to the to-be-posted information, and sending the server the identification information and the second indication information corresponding to the to-be-posted information.

20 Claims, 7 Drawing Sheets

(51) Int. Cl.
*H04L 12/58* (2006.01)
*G06F 16/34* (2019.01)
*G06F 16/957* (2019.01)
*H04L 29/08* (2006.01)

(56) References Cited

U.S. PATENT DOCUMENTS

| | | |
|---|---|---|
| 2008/0235268 A1 | 9/2008 | Miyoshi et al. |
| 2013/0080926 A1* | 3/2013 | Katakawa ................ G06F 3/01 |
| | | 715/753 |
| 2013/0325925 A1* | 12/2013 | Mizuki .................. H04L 67/42 |
| | | 709/203 |
| 2014/0012806 A1* | 1/2014 | Ching .................. H04L 67/306 |
| | | 707/609 |
| 2014/0012932 A1 | 1/2014 | Sharaf et al. |
| 2014/0068465 A1 | 3/2014 | Zhang et al. |
| 2014/0074954 A1 | 3/2014 | Jin et al. |
| 2014/0250406 A1 | 9/2014 | Seo et al. |
| 2014/0337418 A1* | 11/2014 | Matsuyama ........... G06Q 30/02 |
| | | 709/203 |
| 2015/0339303 A1* | 11/2015 | Perlegos ............. G06F 16/9558 |
| | | 707/756 |
| 2017/0034112 A1* | 2/2017 | Perlegos ................. H04L 51/32 |

FOREIGN PATENT DOCUMENTS

| | | |
|---|---|---|
| CN | 102624647 A | 8/2012 |
| CN | 102769579 A | 11/2012 |
| CN | 102999503 A | 3/2013 |
| CN | 103279490 A | 9/2013 |
| CN | 103297319 A | 9/2013 |
| CN | 103955458 A | 7/2014 |
| CN | 104035708 A | 9/2014 |
| WO | 2013103978 A2 | 7/2013 |

* cited by examiner

INFORMATION TRANSFER METHOD, CLIENT, AND SERVER

CROSS REFERENCE TO RELATED APPLICATIONS

The present application claims priority under 35 U.S.C. § 365 to International Patent Application No. PCT/CN2014/087806 filed Sep. 29, 2014 which is incorporated herein by reference into the present disclosure as if fully set forth herein.

TECHNICAL FIELD

The present invention relates to the field of Internet technologies, and in particular, to an information transfer method, a client, and a server.

BACKGROUND

With the advent of the we-media era, increasing social networks are developed to be used by users. Generally, a piece of information posted by a user is processed and presented on an existing social network (such as Facebook or Twitter) in a format preset on the social network. During editing, the user hardly needs to describe how to present the information posted by the user. In addition, on a user interface provided in a system, a user can operate (such as post, forward, or comment) one piece of information by taking it as a whole, which is helpful for communication between users.

On a social network on which short text information is used as a basic communication unit, one piece of information is usually difficult to express a complex meaning because of a word count limit, and even one piece of quite long information needs to be written to express the complex meaning, which loses an advantage of a short text. In view of this, a resolving idea is provided in the prior art: In a network system, particularly in a social network system, on the premise that a user can still post one piece of information with a simple structure and use the piece of information as a basic unit for expressing a meaning, one piece of information with a new information structure is added to be used by the user as a basic unit for expressing a meaning. A manner of describing relative locations of multiple basic units when the multiple basic units for expressing meanings are being presented and referencing the multiple basic units is used for the piece of information with the new information structure to express the meaning by using a combination of these referenced basic units. When editing and posting the foregoing piece of new information, the user may choose to reference which basic units for the information, and set relative locations of the foregoing referenced basic units when the foregoing referenced basic units are being presented. The foregoing referenced basic unit may also be one piece of information with a new information structure. In this way, information expression efficiency of the system is improved.

The foregoing piece of information with the new information structure may be one piece of non-combination information, or may be one piece of combination information. A user posts one piece of combination information, and in view of some cases (for example, distorted understanding avoidance, copyright protection, and a business policy), the user may require that another user should abide by a corresponding rule when using the piece of combination information to constitute new combination information. For example, the piece of combination information sequentially includes five pieces of sub-information A1, A2, A3, A4, and A5, and the user expects that when using the foregoing five pieces of sub-information posted by the user, to constitute new combination information, another user needs to retain two pieces of sub-information in the five pieces of sub-information, for example, when the sub-information A2 is used to constitute new combination information, the sub-information A1 and the sub-information A2 also need to be added to the new combination information; or needs to keep relative locations of multiple pieces of sub-information unchanged, for example, when three pieces of sub-information A2, A4, and A5 are used to constitute new combination information, relative locations of the three pieces of sub-information are kept unchanged. The technical problem cannot be resolved in a solution in the prior art, and consequently, a user cannot protect lawful rights of an information publisher cannot be protected, and user experience is relatively poor.

SUMMARY

In view of this, embodiments of the present invention provide an information transfer method, a client, and a server, to resolve a prior-art technical problem of high information utilization randomness and poor user experience of an information publisher resulting from a case in which after a user posts information in a network system environment, the information cannot be utilized according to a utilization rule preset by the user.

According to a first aspect, an embodiment of the present invention provides an embodiment of an information transfer method.

In a first possible implementation manner, the method includes:

sending, by a client, a data obtaining request to a server, where the data obtaining request is used to obtain information associated with a user account of the client;

receiving, by the client, N pieces of information and N pieces of corresponding identification information sent by the server according to the data obtaining request, where the N pieces of identification information are used to respectively and uniquely identify the N pieces of information in a system that includes the client and the server, and N is an integer greater than or equal to 2;

when an $i^{th}$ piece of information in the N pieces of information is combination information that includes multiple pieces of information, presenting, by the client according to first indication information corresponding to the $i^{th}$ piece of information, the multiple pieces of information included in the $i^{th}$ piece of information, where the first indication information is used to indicate a relative location relationship among the multiple pieces of information included in the $i^{th}$ piece of information when the multiple pieces of information included in the $i^{th}$ piece of information are being presented, and i is an integer greater than or equal to 1 and less than or equal to N; or when the $i^{th}$ piece of information in the N pieces of information is non-combination information, presenting, by the client, the $i^{th}$ piece of information;

obtaining, by the client, attribute information of at least two pieces of information in the N pieces of information, where the attribute information includes at least one of the following attributes of the at least two pieces of information: content separability or location adjustability;

generating, by the client, to-be-posted information according to the attribute information of the at least two pieces of information and an operation instruction of a user for the at least two pieces of information, where the to-be-posted information is information obtained by the user by editing the at least two pieces of information according to the attribute information of the at least two pieces of information; and determining, by the client, identification information corresponding to the to-be-posted information and second indication information corresponding to the to-be-posted information, and sending the server the identification information and the second indication information corresponding to the to-be-posted information.

With reference to the first possible implementation manner of the first aspect, in a second possible implementation manner, the attribute information includes the content separability, and the obtaining, by the client, attribute information of at least two pieces of information in the N pieces of information includes:

obtaining, by the client, the content separability of the at least two pieces of information in the N pieces of information, to determine that the at least two pieces of information are content inseparable information; and the generating, by the client, to-be-posted information according to the attribute information of the at least two pieces of information and an operation instruction of a user for at least two pieces of information includes:

prompting, by the client according to the content separability of the at least two pieces of information, the user that the at least two pieces of information are content inseparable information; and receiving, by the client, an operation instruction of the user for the at least two pieces of content inseparable information, and generating the to-be-posted information.

With reference to the first possible implementation manner of the first aspect, in a third possible implementation manner, the attribute information includes the location adjustability, and the obtaining, by the client, attribute information of at least two pieces of information in the N pieces of information includes:

obtaining, by the client, the location adjustability of the at least two pieces of information in the N pieces of information, to determine that the at least two pieces of information are location nonadjustable information; and the generating, by the client, to-be-posted information according to the attribute information of the at least two pieces of information and an operation instruction of a user for at least two pieces of information in the $i^{th}$ piece of information includes:

prompting, by the client according to the location adjustability of the at least two pieces of information, the user that the at least two pieces of information are location nonadjustable information; and receiving, by the client, an operation instruction of the user for the at least two pieces of location nonadjustable information, and generating the to-be-posted information.

With reference to the first possible implementation manner of the first aspect, in a fourth possible implementation manner, the attribute information includes the content separability and the location adjustability, and the obtaining, by the client, attribute information of at least two pieces of information in the N pieces of information includes:

obtaining, by the client, the content separability and the location adjustability of the at least two pieces of information in the N pieces of information, to determine that the at least two pieces of information are content separable and location nonadjustable information; and the generating, by the client, to-be-posted information according to the attribute information of the at least two pieces of information and an operation instruction of a user for at least two pieces of information in the $i^{th}$ piece of information includes:

prompting, by the client according to the content separability and the location adjustability of the at least two pieces of information, the user that the at least two pieces of information are content separable and location nonadjustable information; and receiving, by the client, an operation instruction of the user for the at least two pieces of content separable and location nonadjustable information, and generating the to-be-posted information.

With reference to the first possible implementation manner of the first aspect, in a fifth possible implementation manner, the attribute information includes the content separability and the location adjustability, and the obtaining, by the client, attribute information of at least two pieces of information in the N pieces of information includes:

obtaining, by the client, the content separability and the location adjustability of the at least two pieces of information in the N pieces of information, to determine that the at least two pieces of information are content inseparable and location nonadjustable information; and the generating, by the client, to-be-posted information according to the attribute information of the at least two pieces of information and an operation instruction of a user for at least two pieces of information in the $i^{th}$ piece of information includes:

prompting, by the client according to the content separability and the location adjustability of the at least two pieces of information, the user that the at least two pieces of information are content inseparable and location nonadjustable information; and receiving, by the client, an operation instruction of the user for the at least two pieces of content inseparable and location nonadjustable information, and generating the to-be-posted information.

With reference to the first possible implementation manner of the first aspect, in a sixth possible implementation manner, the attribute information includes the content separability and the location adjustability, and the obtaining, by the client, attribute information of at least two pieces of information in the N pieces of information includes:

obtaining, by the client, the content separability and the location adjustability of the at least two pieces of information in the N pieces of information, to determine that the at least two pieces of information are content inseparable and location adjustable information; and the generating, by the client, to-be-posted information according to the attribute information of the at least two pieces of information and an operation instruction of a user for at least two pieces of information in the $i^{th}$ piece of information includes:

prompting, by the client according to the content separability and the location adjustability of the at least two pieces of information, the user that the at least two pieces of information are content inseparable and location adjustable information; and receiving, by the client, an operation instruction of the user for the at least two pieces of content inseparable and location adjustable information, and generating the to-be-posted information.

With reference to any one of the first to the sixth possible implementation manners of the first aspect, in a seventh possible implementation manner, at least one piece of information in the at least two pieces of information is combination information that includes multiple pieces of information.

With reference to any one of the first to the sixth possible implementation manners of the first aspect, in an eighth possible implementation manner, the $i^{th}$ piece of information in the N pieces of information is combination information that includes multiple pieces of information, and the obtaining, by the client, attribute information of at least two pieces of information in the N pieces of information includes:

obtaining, by the client, attribute information of at least two pieces of information in the $i^{th}$ piece of information; and the generating, by the client, to-be-posted information according to the attribute information of the at least two pieces of information and an operation instruction of a user for the at least two pieces of information includes:

generating, by the client, to-be-posted information according to the attribute information of the at least two pieces of information and an operation instruction of the user for the at least two pieces of information in the $i^{th}$ piece of information, where the to-be-posted information is information obtained by the user by editing the at least two pieces of information in the $i^{th}$ piece of information according to the attribute information of the at least two pieces of information.

With reference to the eighth possible implementation manner of the first aspect, in a ninth possible implementation manner, the at least two pieces of information in the $i^{th}$ piece of information are specifically all information included in the $i^{th}$ piece of information.

With reference to any one of the first to the ninth possible implementation manners of the first aspect, in a tenth possible implementation manner, before the sending the server the identification information and the second indication information corresponding to the to-be-posted information, the method further includes:

obtaining, by the client, a setting instruction of the user for attribute information of the to-be-posted information, and determining the attribute information of the to-be-posted information; or setting, by the client, attribute information of the to-be-posted information according to a preset rule; and the sending the server the identification information and the second indication information corresponding to the to-be-posted information includes:

sending the server the identification information and the second indication information corresponding to the to-be-posted information and the attribute information of the to-be-posted information.

According to a second aspect, an embodiment of the present invention provides an embodiment of an information transfer method.

In a first possible implementation manner, the method includes:

receiving, by a server, at least two pieces of information, first indication information corresponding to the at least two pieces of information, and attribute information of the at least two pieces of information, where the foregoing information is sent by a first client, the first indication information is used to indicate a relative location relationship between the at least two pieces of information when the at least two pieces of information are being presented, and the attribute information includes at least one of the following attributes of the at least two pieces of information: content separability or location adjustability;

saving, by the server, first identification information, where the first identification information is used to uniquely identify a combination of the at least two pieces of information and the first indication information in a system that includes the server and the first client;

receiving, by the server, a data obtaining request sent by a second client, where the data obtaining request is used to request the server to send the second client information associated with a user account of the second client; and when determining that the combination of the at least two pieces of information and the first indication information is information associated with the user account of the second client, sending, by the server, the second client the at least two pieces of information, the first indication information, the attribute information of the at least two pieces of information, and second identification information, where the second identification information is used to uniquely identify the combination of the at least two pieces of information and the first indication information in a system that includes the server and the second client.

With reference to the first possible implementation manner of the second aspect, in a second possible implementation manner, the sending, by the server, the second client the at least two pieces of information, the first indication information, the attribute information of the at least two pieces of information, and second identification information includes:

generating, by the server, a file in a predetermined format according to a preset rule and the attribute information of the at least two pieces of information, where the file in the predetermined format includes the at least two pieces of information, the second identification information, setting that is of relative locations of the at least two pieces of information when the at least two pieces of information are being presented and that is set according to the first indication information, and setting that is of a format of the at least two pieces of information when the at least two pieces of information are being presented and that is set according to the attribute information of the at least two pieces of information; and sending, by the server, the file in the predetermined format to the second client.

With reference to the second possible implementation manner of the second aspect, in a third possible implementation manner, the file in the predetermined format is a Hypertext Markup Language file.

With reference to any one of the first to the third possible implementation manners of the second aspect, in a fourth possible implementation manner, the at least two pieces of information are at least two pieces of information included in one piece of combination information sent by the first client.

According to a third aspect, an embodiment of the present invention provides an embodiment of an information transfer method.

In a first possible implementation manner, the method includes: receiving, by a first client, at least two pieces of information, identification information corresponding to the at least two pieces of information, first indication information corresponding to the at least two pieces of information, and attribute information of the at least two pieces of information, where the foregoing information is sent by a second client, identification information corresponding to each piece of information in the at least two pieces of information is used to uniquely identify each piece of information in the at least two pieces of information in a system that includes the first client and the second client, the first indication information is used to indicate a relative location relationship between the at least two pieces of information when the at least two pieces of information are being presented, and the attribute information includes at least one of the following attributes of the at least two pieces of information: content separability or location adjustability;

presenting, by the first client, the at least two pieces of information according to the first indication information;

generating, by the first client, to-be-posted information according to the attribute information of the at least two pieces of information and an operation instruction of a user for the at least two pieces of information, where the to-be-posted information is information obtained by the user by editing the at least two pieces of information according to the attribute information of the at least two pieces of information;

determining, by the first client, identification information corresponding to the to-be-posted information and second indication information corresponding to the to-be-posted information, where the second indication information is used to indicate a relative location relationship between the to-be-posted information when the to-be-posted information is being presented; and sending, by the first client, the second client the to-be-posted information and the identification information and the second indication information corresponding to the to-be-posted information.

With reference to the first possible implementation manner of the third aspect, in a second possible implementation manner, the attribute information is the content separability, and before the generating, by the first client, to-be-posted information according to the attribute information of the at least two pieces of information and an operation instruction of a user for the at least two pieces of information, the method further includes:

obtaining, by the first client, the content separability of the at least two pieces of information, to determine that the at least two pieces of information are content inseparable information; and the generating, by the first client, to-be-posted information according to the attribute information of the at least two pieces of information and an operation instruction of a user for the at least two pieces of information includes:

prompting, by the first client according to the content separability of the at least two pieces of information, the user that the at least two pieces of information are content inseparable information; and receiving, by the first client, the operation instruction of the user for the at least two pieces of content inseparable information, and generating the to-be-posted information.

With reference to the first possible implementation manner of the third aspect, in a third possible implementation manner, the attribute information is the location adjustability, and before the generating, by the first client, to-be-posted information according to the attribute information of the at least two pieces of information and an operation instruction of a user for the at least two pieces of information, the method further includes:

obtaining, by the first client, the location adjustability of the at least two pieces of information, to determine that the at least two pieces of information are location nonadjustable information; and the generating, by the first client, to-be-posted information according to the attribute information of the at least two pieces of information and an operation instruction of a user for the at least two pieces of information includes:

prompting, by the first client according to the location adjustability of the at least two pieces of information, the user that the at least two pieces of information are location nonadjustable information; and receiving, by the first client, the operation instruction of the user for the at least two pieces of location nonadjustable information, and generating the to-be-posted information.

With reference to the first possible implementation manner of the third aspect, in a fourth possible implementation manner, the attribute information is the content separability and the location adjustability, and before the generating, by the first client, to-be-posted information according to the attribute information of the at least two pieces of information and an operation instruction of a user for the at least two pieces of information, the method further includes:

obtaining, by the first client, the content separability and the location adjustability of the at least two pieces of information, to determine that the at least two pieces of information are content separable and location nonadjustable information; and the generating, by the first client, to-be-posted information according to the attribute information of the at least two pieces of information and an operation instruction of a user for the at least two pieces of information includes:

prompting, by the first client according to the content separability and the location adjustability of the at least two pieces of information, the user that the at least two pieces of information are content separable and location nonadjustable information; and receiving, by the first client, the operation instruction of the user for the at least two pieces of content separable and location nonadjustable information, and generating the to-be-posted information.

With reference to the first possible implementation manner of the third aspect, in a fifth possible implementation manner, the attribute information is the content separability and the location adjustability, and before the generating, by the first client, to-be-posted information according to the attribute information of the at least two pieces of information and an operation instruction of a user for the at least two pieces of information, the method further includes:

obtaining, by the first client, the content separability and the location adjustability of the at least two pieces of information, to determine that the at least two pieces of information are content inseparable and location nonadjustable information; and the generating, by the first client, to-be-posted information according to the attribute information of the at least two pieces of information and an operation instruction of a user for the at least two pieces of information includes:

prompting, by the first client according to content separability and the location adjustability of the at least two pieces of information, the user that the at least two pieces of information are content inseparable and location nonadjustable information; and receiving, by the first client, the operation instruction of the user for the at least two pieces of content inseparable and location nonadjustable information, and generating the to-be-posted information.

With reference to the first possible implementation manner of the third aspect, in a sixth possible implementation manner, the attribute information is the content separability and the location adjustability, and before the generating, by the first client, to-be-posted information according to the attribute information of the at least two pieces of information and an operation instruction of a user for the at least two pieces of information, the method further includes:

obtaining, by the first client, the content separability and the location adjustability of the at least two pieces of information, to determine that the at least two pieces of information are content inseparable and location adjustable information; and the generating, by the first client, to-be-posted information according to the attribute information of the at least two pieces of information and an operation instruction of a user for the at least two pieces of information includes:

prompting, by the first client according to the content separability and the location adjustability of the at least two pieces of information, the user that the at least two pieces of information are content inseparable and location adjustable information; and receiving, by the first client, the operation instruction of the user for the at least two pieces of content inseparable and location adjustable information, and generating the to-be-posted information.

With reference to the first to the sixth possible implementation manners of the third aspect, in a seventh possible implementation manner, the receiving, by a first client, at least two pieces of information, identification information corresponding to the at least two pieces of information, first indication information corresponding to the at least two pieces of information, and attribute information of the at least two pieces of information, where the foregoing information is sent by a second client includes:

receiving, by the first client, the at least two pieces of information, the identification information corresponding to the at least two pieces of information, the first indication information corresponding to the at least two pieces of information, and the attribute information of the at least two pieces of information, where the foregoing information is sent by the second client by using a server; and the sending, by the first client, the second client the to-be-posted information and the identification information and the second indication information corresponding to the to-be-posted information includes:

sending, by the first client by using the server, the second client the to-be-posted information and the identification information and the second indication information corresponding to the to-be-posted information.

With reference to the first to the seventh possible implementation manners of the third aspect, in an eighth possible implementation manner, before the sending, by the first client, the second client the to-be-posted information and the identification information and the second indication information corresponding to the to-be-posted information, the method further includes:

obtaining, by the first client, a setting instruction of the user for attribute information of the to-be-posted information, and determining the attribute information of the to-be-posted information; or setting, by the first client, attribute information of the to-be-posted information according to a preset rule; and the sending, by the first client, the second client the to-be-posted information and the identification information and the second indication information corresponding to the to-be-posted information includes:

sending, by the first client, the second client the to-be-posted information, the identification information and the second indication information corresponding to the to-be-posted information, and the attribute information of the to-be-posted information.

With reference to the first to the eighth possible implementation manners of the third aspect, in a ninth possible implementation manner, the at least two pieces of information are at least two pieces of information included in one piece of combination information sent by the second client, and the identification information corresponding to the at least two pieces of information is identification information corresponding to the piece of combination information.

According to a fourth aspect, an embodiment of the present invention provides an embodiment of a client.

In a first possible implementation manner, the client includes a transmitter, a receiver, a processor, an output device, and an input device, the transmitter is connected to the processor, the receiver is connected to the processor, the output device is connected to the processor, and the input device is connected to the processor; where the transmitter is configured to send a data obtaining request to a server, where the data obtaining request is used to obtain information associated with a user account of the client;

the receiver is configured to receive N pieces of information and N pieces of corresponding identification information sent by the server according to the data obtaining request, where the N pieces of identification information are used to respectively and uniquely identify the N pieces of information in a system that includes the client and the server, and N is an integer greater than or equal to 2;

the output device is configured to: when the $i^{th}$ piece of information in the N pieces of information is combination information that includes multiple pieces of information, present, according to first indication information corresponding to the $i^{th}$ piece of information, the multiple pieces of information included in the $i^{th}$ piece of information, where the first indication information is used to indicate a relative location relationship among the multiple pieces of information included in the $i^{th}$ piece of information when the multiple pieces of information included in the $i^{th}$ piece of information are being presented; or when the $i^{th}$ piece of information in the N pieces of information is non-combination information, present the $i^{th}$ piece of information, where i is an integer greater than or equal to 1 and less than or equal to N;

the processor is configured to obtain attribute information of at least two pieces of information in the N pieces of information, where the attribute information includes at least one of the following attributes of the at least two pieces of information: content separability or location adjustability;

the input device is configured to obtain an operation instruction of a user for the at least two pieces of information;

the processor is further configured to generate to-be-posted information according to the attribute information of the at least two pieces of information and the operation instruction of the user for the at least two pieces of information, where the to-be-posted information is information obtained by the user by editing the at least two pieces of information according to the attribute information of the at least two pieces of information;

the processor is further configured to determine identification information corresponding to the to-be-posted information and second indication information corresponding to the to-be-posted information; and the transmitter is further configured to: after the processor determines the identification information corresponding to the to-be-posted information and the second indication information corresponding to the to-be-posted information, send the server the identification information and the second indication information corresponding to the to-be-posted information.

With reference to the first possible implementation manner of the fourth aspect, in a second possible implementation manner, the attribute information includes the content separability;

the processor is specifically configured to obtain the content separability of the at least two pieces of information in the N pieces of information, to determine that the at least two pieces of information are content inseparable information;

the output device is further configured to: when the processor determines that the at least two pieces of information are content inseparable information, prompt the user that the at least two pieces of information are content inseparable information;

the input device is specifically configured to receive an operation instruction of the user for the at least two pieces of content inseparable information; and the processor is specifically configured to generate the to-be-posted information according to the operation instruction that is of the user for the at least two pieces of content inseparable information and is received by the input device.

With reference to the first possible implementation manner of the fourth aspect, in a third possible implementation manner, the attribute information includes the location adjustability;

the processor is specifically configured to obtain the location adjustability of the at least two pieces of information in the N pieces of information, to determine that the at least two pieces of information are location nonadjustable information;

the output device is further configured to: when the processor determines that the at least two pieces of information are location nonadjustable information, prompt the user that the at least two pieces of information are location nonadjustable information;

the input device is specifically configured to receive an operation instruction of the user for the at least two pieces of location nonadjustable information; and the processor is specifically configured to generate the to-be-posted information according to the operation instruction that is of the user for the at least two pieces of location nonadjustable information and is received by the input device.

With reference to the first possible implementation manner of the fourth aspect, in a fourth possible implementation manner, the attribute information includes the content separability and the location adjustability;

the processor is specifically configured to obtain the content separability and the location adjustability of the at least two pieces of information in the N pieces of information, to determine that the at least two pieces of information are content separable and location nonadjustable information;

the output device is further configured to: when the processor determines that the at least two pieces of information are content separable and location nonadjustable information, prompt the user that the at least two pieces of information are content separable and location nonadjustable information;

the input device is specifically configured to receive an operation instruction of the user for the at least two pieces of content separable and location nonadjustable information; and the processor is specifically configured to generate the to-be-posted information according to the operation instruction that is of the user for the at least two pieces of content separable and location nonadjustable information and is received by the input device.

With reference to the first possible implementation manner of the fourth aspect, in a fifth possible implementation manner, the attribute information includes the content separability and the location adjustability;

the processor is specifically configured to obtain the content separability and the location adjustability of the at least two pieces of information in the N pieces of information, to determine that the at least two pieces of information are content inseparable and location nonadjustable information;

the output device is further configured to: when the processor determines that the at least two pieces of information are content inseparable and location nonadjustable information, prompt the user that the at least two pieces of information are content inseparable and location nonadjustable information;

the input device is specifically configured to receive an operation instruction of the user for the at least two pieces of content inseparable and location nonadjustable information; and the processor is specifically configured to generate the to-be-posted information according to the operation instruction that is of the user for the at least two pieces of content inseparable and location nonadjustable information and is received by the input device.

With reference to the first possible implementation manner of the fourth aspect, in a sixth possible implementation manner, the attribute information includes the content separability and the location adjustability;

the processor is specifically configured to obtain the content separability and the location adjustability of the at least two pieces of information in the N pieces of information, to determine that the at least two pieces of information are content inseparable and location adjustable information;

the output device is further configured to: when the processor determines that the at least two pieces of information are content inseparable and location adjustable information, prompt the user that the at least two pieces of information are content inseparable and location adjustable information;

the input device is specifically configured to receive an operation instruction of the user for the at least two pieces of content inseparable and location adjustable information; and the processor is specifically configured to generate the to-be-posted information according to the operation instruction that is of the user for the at least two pieces of content inseparable and location adjustable information and is received by the input device.

With reference to the first to the sixth possible implementation manners of the fourth aspect, in a seventh possible implementation manner, at least one piece of information in the at least two pieces of information is combination information that includes multiple pieces of information.

With reference to the first to the sixth possible implementation manners of the fourth aspect, in an eighth possible implementation manner, the $i^{th}$ piece of information in the N pieces of information is combination information that includes multiple pieces of information; and the processor is specifically configured to: obtain attribute information of at least two pieces of information in the $i^{th}$ piece of information, and generate to-be-posted information according to the attribute information of the at least two pieces of information and an operation instruction of the user for the at least two pieces of information in the $i^{th}$ piece of information.

With reference to the eighth possible implementation manner of the fourth aspect, in a ninth possible implementation manner, the at least two pieces of information in the $i^{th}$ piece of information are specifically all information included in the $i^{th}$ piece of information.

With reference to the first to the ninth possible implementation manners of the fourth aspect, in a tenth possible implementation manner, the processor is further configured to: before the transmitter sends the server the identification information and the second indication information corresponding to the to-be-posted information, determine attribute information of the to-be-posted information according to a setting instruction of the user for the attribute information of the to-be-posted information; or set attribute information of the to-be-posted information according to a preset rule; and the transmitter is specifically configured to send the server the identification information and the second indication information corresponding to the to-be-posted information and the attribute information of the to-be-posted information.

According to a fifth aspect, an embodiment of the present invention provides an embodiment of a server.

In a first possible implementation manner, the server includes a receiver, a memory, a processor, and a transmitter, the receiver is connected to the processor, the memory is connected to the processor, and the transmitter is connected to the processor; where the receiver is configured to receive at least two pieces of information, first indication information corresponding to the at least two pieces of information, and attribute information of the at least two pieces of information, where the foregoing information is sent by a first client, the first indication information is used to indicate a relative location relationship between the at least two pieces of information when the at least two pieces of information are being presented, and the attribute information includes at least one of the following attributes of the at least two pieces of information: content separability or location adjustability;

the memory is configured to save first identification information, where the first identification information is used to uniquely identify a combination of the at least two pieces of information and the first indication information in a system that includes the server and the first client;

the receiver is further configured to receive a data obtaining request sent by a second client, where the data obtaining request is used to request the server to send the second client information associated with a user account of the second client;

the processor is configured to determine whether the combination of the at least two pieces of information and the first indication information is associated with the user account of the second client; and the transmitter is configured to: when the processor determines that the combination of the at least two pieces of information and the first indication information is information associated with the user account of the second client, send the second client the at least two pieces of information, the first indication information, the attribute information of the at least two pieces of information, and second identification information, where the second identification information is used to uniquely identify the combination of the at least two pieces of information and the first indication information in a system that includes the server and the second client.

With reference to the first possible implementation manner of the fifth aspect, in a second possible implementation manner, the processor is further configured to: when determining that the combination of the at least two pieces of information and the first indication information is information associated with the user account of the second client, generate a file in a predetermined format according to a preset rule and the attribute information of the at least two pieces of information, where the file in the predetermined format includes the at least two pieces of information, the second identification information, setting that is of relative locations of the at least two pieces of information when the at least two pieces of information are being presented and that is set according to the first indication information, and setting that is of a format of the at least two pieces of information when the at least two pieces of information are being presented and that is set according to the attribute information of the at least two pieces of information; and the transmitter is specifically configured to send the file in the predetermined format to the second client.

With reference to the second possible implementation manner of the fifth aspect, in a third possible implementation manner, the file in the predetermined format is a Hypertext Markup Language file.

With reference to any one of the first to the third possible implementation manners of the fifth aspect, in a fourth possible implementation manner, the at least two pieces of information are at least two pieces of information included in one piece of combination information sent by the first client.

According to a sixth aspect, an embodiment of the present invention provides an embodiment of a client.

In a first possible implementation manner, the client includes a receiver, an output device, an input device, a processor, and a transmitter, the receiver is connected to the processor, the input device is connected to the processor, the output device is connected to the processor, and the transmitter is connected to the processor; where the receiver is configured to receive at least two pieces of information, identification information corresponding to the at least two pieces of information, first indication information corresponding to the at least two pieces of information, and attribute information of the at least two pieces of information, where the foregoing information is sent by a second client, identification information corresponding to each piece of information in the at least two pieces of information is used to uniquely identify each piece of information in the at least two pieces of information in a system that includes the first client and the second client, the first indication information is used to indicate a relative location relationship between the at least two pieces of information when the at least two pieces of information are being presented, and the attribute information includes at least one of the following attributes of the at least two pieces of information: content separability or location adjustability;

the output device is configured to present the at least two pieces of information according to the first indication information;

the input device is configured to obtain an operation instruction of a user for the at least two pieces of information;

the processor is configured to generate to-be-posted information according to the attribute information of the at least two pieces of information and the operation instruction of the user for the at least two pieces of information, where the to-be-posted information is information obtained by the user by editing the at least two pieces of information according to the attribute information of the at least two pieces of information;

the processor is further configured to determine identification information corresponding to the to-be-posted information and second indication information corresponding to the to-be-posted information, where the second indication information is used to indicate a relative location relationship between the to-be-posted information when the to-be-posted information is being presented; and the transmitter is configured to send the second client the to-be-posted information and the identification information and the second indication information corresponding to the to-be-posted information.

With reference to the first possible implementation manner of the sixth aspect, in a second possible implementation manner, the attribute information is the content separability, and the processor is further configured to: before generating the to-be-posted information according to the attribute information of the at least two pieces of information and the operation instruction of the user for the at least two pieces of information, obtain the content separability of the at least two pieces of information, to determine that the at least two pieces of information are content inseparable information;

the output device is further configured to prompt, according to the content separability of the at least two pieces of information, the user that the at least two pieces of information are content inseparable information;

the input device is specifically configured to receive an operation instruction of the user for the at least two pieces of content inseparable information; and the processor is specifically configured to generate the to-be-posted information according to the operation instruction of the user for the at least two pieces of content inseparable information.

With reference to the first possible implementation manner of the sixth aspect, in a third possible implementation manner, the attribute information is the location adjustability, and the processor is further configured to: before generating the to-be-posted information according to the attribute information of the at least two pieces of information and the operation instruction of the user for the at least two pieces of information, obtain the location adjustability of the at least two pieces of information, to determine that the at least two pieces of information are location nonadjustable information;

the output device is further configured to prompt, according to the location adjustability of the at least two pieces of information, the user that the at least two pieces of information are location nonadjustable information;

the input device is specifically configured to receive an operation instruction of the user for the at least two pieces of location nonadjustable information; and the processor is specifically configured to generate the to-be-posted information according to the operation instruction of the user for the at least two pieces of location nonadjustable information.

With reference to the first possible implementation manner of the sixth aspect, in a fourth possible implementation manner, the attribute information is the content separability and the location adjustability, and the processor is further configured to: before generating the to-be-posted information according to the attribute information of the at least two pieces of information and the operation instruction of the user for the at least two pieces of information, obtain the content separability and the location adjustability of the at least two pieces of information, to determine that the at least two pieces of information are content separable and location nonadjustable information;

the output device is further configured to prompt, according to the content separability and the location adjustability of the at least two pieces of information, the user that the at least two pieces of information are content separable and location nonadjustable information;

the input device is specifically configured to receive an operation instruction of the user for the at least two pieces of content separable and location nonadjustable information; and the processor is specifically configured to generate the to-be-posted information according to the operation instruction of the user for the at least two pieces of content separable and location nonadjustable information.

With reference to the first possible implementation manner of the sixth aspect, in a fifth possible implementation manner, the attribute information is the content separability and the location adjustability, and the processor is further configured to: before generating the to-be-posted information according to the attribute information of the at least two pieces of information and the operation instruction of the user for the at least two pieces of information, obtain the content separability and the location adjustability of the at least two pieces of information, to determine that the at least two pieces of information are content inseparable and location nonadjustable information;

the output device is further configured to prompt, according to content separability and the location adjustability of the at least two pieces of information, the user that the at least two pieces of information are content inseparable and location nonadjustable information;

the input device is specifically configured to receive an operation instruction of the user for the at least two pieces of content inseparable and location nonadjustable information; and the processor is specifically configured to generate the to-be-posted information according to the operation instruction of the user for the at least two pieces of content inseparable and location nonadjustable information.

With reference to the first possible implementation manner of the sixth aspect, in a sixth possible implementation manner, the attribute information is the content separability and the location adjustability, and the processor is further configured to: before generating the to-be-posted information according to the attribute information of the at least two pieces of information and the operation instruction of the user for the at least two pieces of information, obtain the content separability and the location adjustability of the at least two pieces of information, to determine that the at least two pieces of information are content inseparable and location adjustable information;

the output device is further configured to prompt, according to the content separability and the location adjustability of the at least two pieces of information, the user that the at least two pieces of information are content inseparable and location adjustable information;

the input device is specifically configured to receive an operation instruction of the user for the at least two pieces of content inseparable and location adjustable information; and the processor is specifically configured to generate the to-be-posted information according to the operation instruction of the user for the at least two pieces of content inseparable and location adjustable information.

With reference to any one of the first to the sixth possible implementation manners of the sixth aspect, in a seventh possible implementation manner, the receiver is specifically configured to receive the at least two pieces of information, the identification information corresponding to each piece of information in the at least two pieces of information, the first indication information corresponding to the at least two pieces of information, and the attribute information of the at least two pieces of information, where the foregoing information is sent by the second client by using a server; and the transmitter is specifically configured to send, by using the server, the second client the to-be-posted information and the identification information and the second indication information corresponding to the to-be-posted information.

With reference to any one of the first to the seventh possible implementation manners of the sixth aspect, in an eighth possible implementation manner, the processor is further configured to: before the transmitter sends the second client the to-be-posted information and the identification information and the second indication information corresponding to the to-be-posted information, determine attribute information of the to-be-posted information according to a setting instruction of the user for the attribute information of the to-be-posted information; or the processor is further configured to set attribute information of the to-be-posted information according to a preset rule; and the transmitter is specifically configured to send the second client the to-be-posted information, the identification information and the second indication information corresponding to the to-be-posted information, and the attribute information of the to-be-posted information.

With reference to the first to the eighth possible implementation manners of the sixth aspect, in a ninth possible implementation manner, the at least two pieces of information are at least two pieces of information included in one piece of combination information sent by the second client, and the identification information corresponding to the at least two pieces of information is identification information corresponding to the piece of combination information.

In the embodiments of the present invention, attribute information of combination information is set and determined, so that information posted by a user may be utilized to a specific extent according to a utilization rule preset by the user, which reduces information utilization randomness, protects lawful rights of an information publisher, and enhances user experience of the information publisher.

BRIEF DESCRIPTION OF THE DRAWINGS

To describe the technical solutions in the embodiments of the present invention more clearly, the following briefly describes the accompanying drawings required for describing the embodiments. Apparently, the accompanying drawings in the following description show merely some embodiments of the present invention, and persons of ordinary skill in the art may still derive other drawings from these accompanying drawings without creative efforts.

DETAILED DESCRIPTION

The following clearly describes the technical solutions in the embodiments of the present invention with reference to the accompanying drawings in the embodiments of the present invention. Apparently, the described embodiments are some but not all of the embodiments of the present invention. All other embodiments obtained by persons of ordinary skill in the art based on the embodiments of the present invention without creative efforts shall fall within the protection scope of the present invention.

The technical solutions of the present invention may be applied to various communications systems, such as a Global System for Mobile Communications (GSM, Global System for Mobile communication), a Code Division Multiple Access (CDMA, Code Division Multiple Access) system, Wideband Code Division Multiple Access (WCDMA, Wideband Code Division Multiple Access), a general packet radio service (GPRS, General Packet Radio Service), and Long Term Evolution (LTE, Long Term Evolution).

Figure 1:
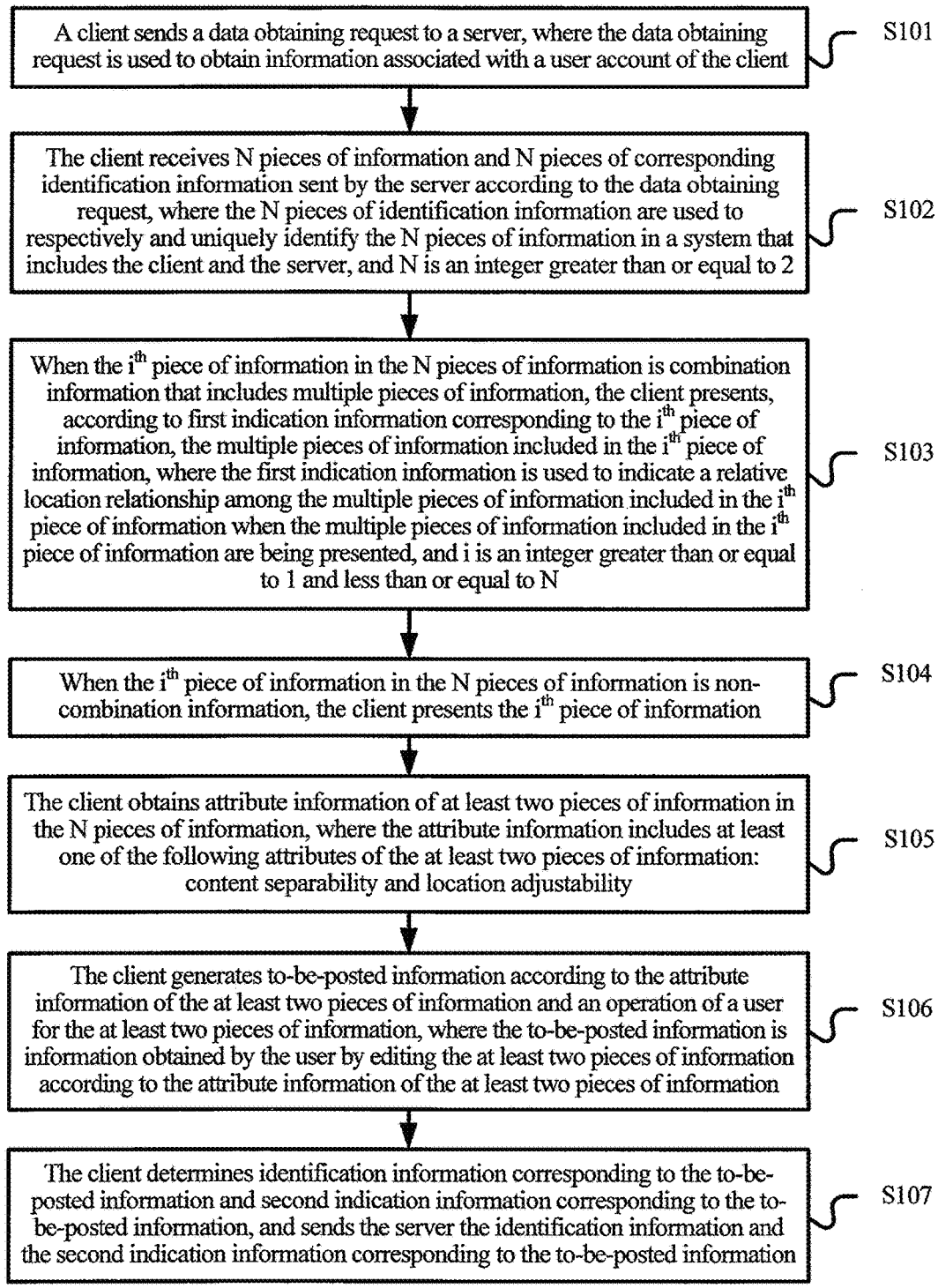
FIG. 1 is a schematic flowchart of an information transferring method according to an embodiment of the present invention.

Referring to FIG. 1, FIG. 1 is a flowchart of an information transfer method according to an embodiment of the present invention. The method includes the following steps:

S101. A client sends a data obtaining request to a server, where the data obtaining request is used to obtain information associated with a user account of the client.

Specifically, a user logs in to a corresponding account, and obtains information from the server by using the client.

S102. The client receives N pieces of information and N pieces of corresponding identification information sent by the server according to the data obtaining request, where the N pieces of identification information are used to respectively and uniquely identify the N pieces of information in a system that includes the client and the server, and N is an integer greater than or equal to 2.

After the client sends the data obtaining request to the server, the server sends the N pieces of information and the N pieces of corresponding identification information to the client in response to the data obtaining request of the client, where each piece of information matches corresponding identification information. After obtaining the N pieces of information, the client may present the N pieces of information on a current terminal interface. The identification information may be an information ID depicted in FIG. 4, or may be a combination of a user id and an information ID.

S103. When the $i^{th}$ piece of information in the N pieces of information is combination information that includes multiple pieces of information, the client presents, according to first indication information corresponding to the $i^{th}$ piece of information, the multiple pieces of information included in the $i^{th}$ piece of information, where the first indication information is used to indicate a relative location relationship among the multiple pieces of information included in the $i^{th}$ piece of information when the multiple pieces of information included in the $i^{th}$ piece of information are being presented, and i is an integer greater than or equal to 1 and less than or equal to N.

The N pieces of information include the $i^{th}$ piece of information, and the $i^{th}$ piece of information is combination information that includes multiple pieces of information. In this case, the combination information is one piece of information obtained by aggregating/combining the multiple pieces of information. The client may obtain the first indication information, determine the relative location relationship among the multiple pieces of information included in the $i^{th}$ piece of information when the multiple pieces of information included in the $i^{th}$ piece of information are being presented, and present, according to a relative location relationship preset for the $i^{th}$ piece of information, the multiple pieces of information included in the $i^{th}$ piece of information. Optionally, that the $i^{th}$ piece of information is combination information that includes multiple pieces of information is specifically that the $i^{th}$ piece of information is combination information that includes at least two pieces of information, that is, the multiple pieces of information are at least two pieces of information. In another implementation manner of this embodiment of the present invention, alternatively, the combination information may be an information combination of multiple pieces of information posted by the user.

S104. When the $i^{th}$ piece of information in the N pieces of information is non-combination information, the client presents the $i^{th}$ piece of information.

S105. The client obtains attribute information of at least two pieces of information in the N pieces of information, where the attribute information includes at least one of the following attributes of the at least two pieces of information: content separability or location adjustability.

In this embodiment of the present invention, there are at least two cases for the at least two pieces of information: In the first case, the at least two pieces of information are at least two pieces of information in the N pieces of information, for example, N is 6 (the N pieces of information are A, B, C, D, E, and F), and the at least two pieces of information are A, B, and C; in the second case, the $i^{th}$ piece of information is combination information, and the at least two pieces of information are at least two pieces of information in the $i^{th}$ piece of information, for example, N is 6 (the N pieces of information are A, B, C, D, E, and F), i is 2, the $i^{th}$ piece of information is B1, B2, B3, B4, and B5, and the at least two pieces of information are B1, B2, and B3. For ease of description, in the following embodiment, the foregoing two cases are covered by using combination information. Before presenting the at least two pieces of information, or after presenting the at least two pieces of information, the client obtains the attribute information of the at least two pieces of information. The at least two pieces of information may be at least two pieces of consecutive information, or may be at least two pieces of inconsecutive information. The at least two pieces of information may be presented in an order in which the at least two pieces of information are sequentially presented, or may be presented in an order in which the at least two pieces of information are not sequentially presented but have determined relative locations. In a possible implementation manner, the $i^{th}$ piece of information is combination information, and the at least two pieces of information are all information included in the $i^{th}$ piece of information. In this case, the client may obtain attribute information of all the information in the $i^{th}$ information.

The attribute information of the at least two pieces of information may include at least one of the following attributes: the content separability and the location adjustability. The attribute information may further include other attribute information, on which no limitation is imposed. In this embodiment of the present invention, when the attribute information includes the content separability and/or the location adjustability, the attribute information includes at least the following three possibilities: The attribute information includes the content separability, the attribute information includes the location adjustability, and the attribute information includes the content separability and the location adjustability.

The content separability is used to identify whether presentation content of the at least two pieces of information can be separated, that is, whether content of the at least two pieces of information can be separated during editing, where the separation includes but is not limited to: deleting content of any piece or any several pieces of information in the at least two pieces of information, inserting content of at least one piece of information into the at least two pieces of information, and independently editing any piece or any several pieces of information in the at least two pieces of information (for example, copying or cutting the any piece or any several pieces of information to other combination information). The location adjustability is used to identify whether relative locations of the at least two pieces of information in the N pieces of information can be adjusted, that is, whether relative presentation locations of the at least two pieces of information can be adjusted during editing. When the $i^{th}$ piece of information is combination information, the location adjustability may be used to identify whether relative locations of the at least two pieces of information in the $i^{th}$ piece of information can be adjusted.

For example, the N pieces of information are obtained by sequentially combining five pieces of information A1, A2, A3, A4, and A5. In a possible implementation manner, the at least two pieces of information are three pieces of consecutive information A2, A3, and A4. In this case, the content separability is used to identify whether presentation content of the three pieces of information A2, A3, and A4 can be separated, that is, whether the three pieces of information A2, A3, and A4 can be separated during editing. It should be understood that the separation herein includes separation that is performed by taking two pieces of consecutive information (such as A2 and A3) in the three pieces of information A2, A3, and A4 as a whole, and further includes separation that is performed by taking the three pieces of information A2, A3, and A4 as one whole piece of information. When content can be separated, the user may perform an edit operation such as separation on the foregoing combination information (the three pieces of information A2, A3, and A4), for example, delete any one of the three pieces of information A2, A3, and A4, insert other information content into the three pieces of information A2, A3, and A4, or independently edit any one of the three pieces of information A2, A3, and A4 (for example, independently copy or cut the information A2 to another piece of combination information). When content cannot be separated, the user needs to perform an edit operation on the whole of the inseparable combination information (the three pieces of information A2, A3, and A4), but cannot edit one piece of information (such as A2) or some pieces of information (such as A3 and A4) in the inseparable combination information (the three pieces of information A2, A3, and A4). When content cannot be separated, the user cannot delete any piece or any two pieces of information in the three pieces of information A2, A3, and A4, cannot insert other information content into the three pieces of information A2, A3, and A4, and cannot independently edit any one of the three pieces of information A2, A3, and A4 (for example, independently copy or cut the information A2 to another piece of combination information). The user can take the three pieces of information A2, A3, and A4 only as a whole, and perform an operation on the whole of the information A2, A3, and A4, for example, copy the whole of the information A2, A3, and A4 to another piece of combination information or delete the whole of the information A2, A3, and A4. The location adjustability is used to identify whether relative presentation locations of the three pieces of consecutive information A2, A3, and A4 can be adjusted, that is, whether the relative locations of the three pieces of information A2, A3, and A4 can be adjusted during editing. When a location can be adjusted, the user may adjust the relative locations of the foregoing three pieces of information, for example, adjust A2, A3, A4 to A3, A2, A4. When a location cannot be adjusted, during editing, the user needs to ensure that the relative locations of the three pieces of information A2, A3, and A4 are unchanged.

In a possible implementation manner, the at least two pieces of information are three pieces of inconsecutive information A1, A3, and A5. In this case, the content separability is used to identify whether presentation content of the three pieces of information A1, A3, and A5 can be separated, that is, whether the three pieces of information A1, A3, and A5 can be separated during editing. It should be understood that the separation includes separation that is performed by taking two pieces of information (such as A1 and A3) in the three pieces of information A1, A3, and A5 as a whole, and further includes separation that is performed by taking the three pieces of information A1, A3, and A5 as one whole piece of information. When content can be separated, the user may perform an edit operation such as separation on the three pieces of information A1, A3, and A5, for example, delete any one of the three pieces of information A1, A3, and A5, insert other information content (or insert other information content except A2 and A4) into the three pieces of information A1, A3, and A5, or independently edit any one of the three pieces of information A1, A3, and A5 (for example, independently copy or cut the information A3 to another piece of combination information). When content cannot be separated, the user cannot delete any piece or any two pieces of information in the three pieces of information A1, A3, and A5, cannot insert other information content (or insert other information content except A2 and A4) into the three pieces of information A1, A3, and A5, and cannot independently edit any one of the three pieces of information A1, A3, and A5 (for example, independently copy or cut the information A3 to another piece of combination information). The user can take the three pieces of information A1, A3, and A5 only as a whole, and perform an operation on the whole of the information A1, A3, and A5, for example, copy the whole of the information A1, A3, and A5 to another piece of combination information or delete the whole of the information A1, A3, and A5. The location adjustability is used to identify whether relative presentation locations of the three pieces of inconsecutive information A1, A3, and A5 can be adjusted. When a location can be adjusted, the user may adjust the relative locations of A1, A3, and A5, for example, adjust A1, A3, A5 to A3, A1, A5. When a location cannot be adjusted, during editing, the user needs to ensure that the relative locations of the three pieces of information A1, A3, and A5 are unchanged.

It should be noted that a focus of the content separability is an attribute of each basic unit when each piece of information in the at least two pieces of information is used as a basic unit. In this embodiment of the present invention, it is not limited whether text content of one individual piece of information in the at least two pieces of information can be edited. That is, after obtaining the attribute information of the at least two pieces of information, when editing the at least two pieces of information, the user may edit text content of one piece of information in the at least two pieces of information, or cannot edit text content of one piece of information in the at least two pieces of information because it is set in the system that the text content of the piece of information in the at least two pieces of information cannot be edited, or may determine, according to setting of the user, whether text content of one piece of information in the at least two pieces of information can be edited, on which no limitation is imposed.

S106. The client generates to-be-posted information according to the attribute information of the at least two pieces of information and an operation instruction of a user for the at least two pieces of information in the N pieces of information, where the to-be-posted information is information obtained by the user by editing the at least two pieces of information in the N pieces of information according to the attribute information of the at least two pieces of information.

After obtaining the attribute information of the at least two pieces of information, the client may prompt, in a preset manner, the user whether the content of the at least two pieces of information can be separated and/or whether the relative locations of the at least two pieces of information can be adjusted. The preset manner may be presenting information with different attributes in different colors, or may be assigning different enabling to edit buttons of information with different attributes, or may be prompting the user in a form of a dialog box when the user performs editing, on which no limitation is imposed. After learning the attribute information of the at least two pieces of information, the user performs an edit operation on the at least two pieces of information according to the attribute information, for example, forwards or enters new information, to generate the to-be-posted information. When performing editing to generate the to-be-posted information, the user may also set attribute information of the to-be-posted information.

S107. The client determines identification information corresponding to the to-be-posted information and second indication information corresponding to the to-be-posted information, and sends the server the identification information and the second indication information corresponding to the to-be-posted information.

After the client obtains the operation instruction of the user and generates the to-be-posted information, the client determines the identification information corresponding to the to-be-posted information, where the identification information corresponding to the to-be-posted information is used to uniquely identify the to-be-posted information in the system that includes the client and the server. The client may further determine the second indication information corresponding to the to-be-posted information, where the second indication information corresponding to the to-be-posted information is used to indicate a relative location relationship among the multiple pieces of information included in the to-be-posted information when multiple pieces of information included in the to-be-posted information are being presented. After obtaining a sending instruction triggered by the user, the client may send the server the identification information and the second indication information corresponding to the to-be-posted information, and send the to-be-posted information to the server. The client may further send the attribute information of the to-be-posted information to the server.

Optionally, the method further includes: obtaining, by the client, a setting instruction of the user for the attribute information of the to-be-posted information, determining the attribute information of the to-be-posted information, and specifically sending, by the client, the server the identification information and the second indication information corresponding to the to-be-posted information and the attribute information of the to-be-posted information; or setting, by the client, the attribute information of the to-be-posted information according to a preset rule, and specifically sending, by the client, the server the identification information and the second indication information corresponding to the to-be-posted information and the attribute information of the to-be-posted information. That is, the client may first set the attribute information of the to-be-posted information according to an operation instruction of the user or the preset rule, and send the server the attribute information together with other information of the to-be-posted information. It should be noted that for setting the attribute information of the to-be-posted information according to the preset rule herein and generating the to-be-posted information according to the operation instruction of the user in the foregoing description, the latter is generating the information according to the operation instruction of the user, and the former may be setting the attribute of the information according to the preset rule when the information is generated according to the operation instruction of the user but the user does not set the attribute of the information.

In this embodiment of the present invention, attribute information of combination information is set and determined, so that in a system that includes a client and a server, information posted by a user may be utilized to a specific extent according to a utilization rule preset by the user, which reduces information utilization randomness, protects lawful rights of an information publisher, and enhances user experience of the information publisher.

In an embodiment of the present invention, the attribute information includes the content separability. Step S105 includes: obtaining, by the client, the content separability of the at least two pieces of information in the N pieces of information, to determine that the at least two pieces of information are content inseparable information. Step S106 includes: prompting, by the client according to the content separability of the at least two pieces of information, the user that the at least two pieces of information are content inseparable information; and receiving, by the client, an operation instruction of the user for the at least two pieces of content inseparable information, and generating the to-be-posted information.

Figures 2, 3:
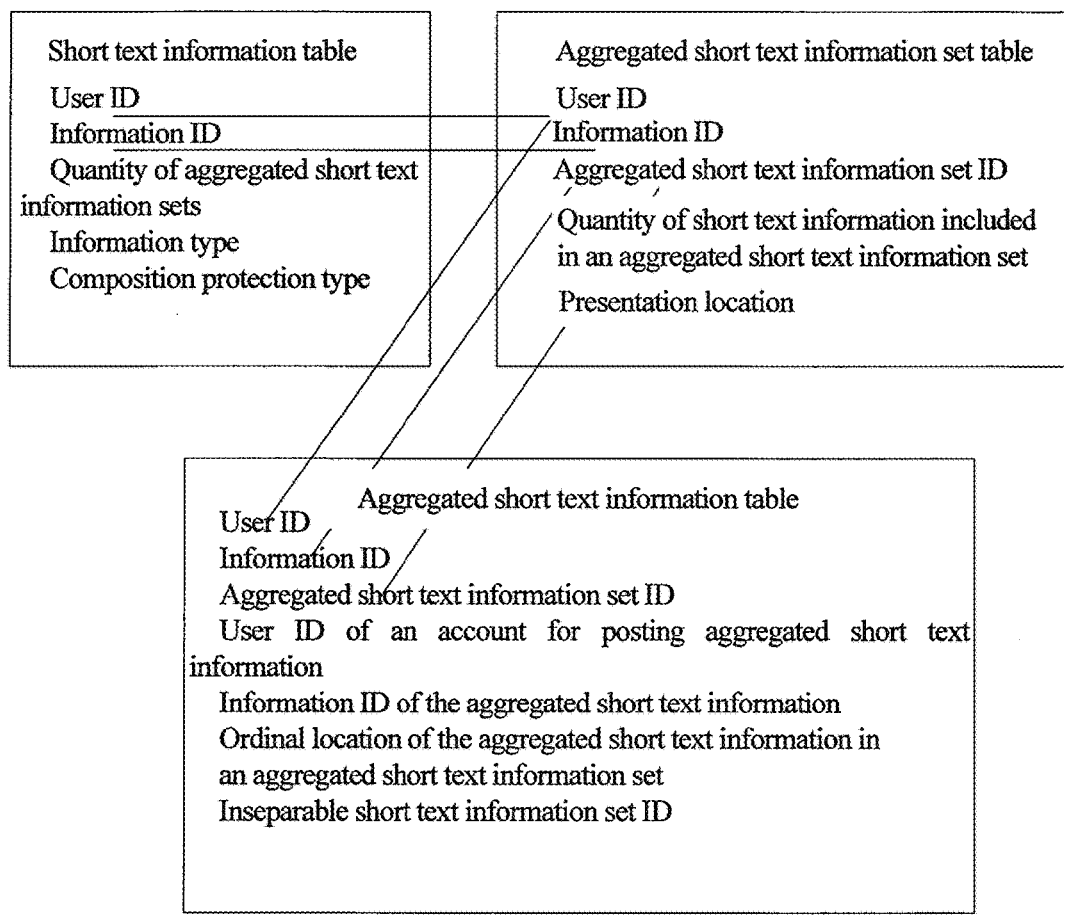
FIG. 2 is a schematic structural diagram of combination information according to an embodiment of the present invention.
FIG. 3 is a schematic diagram of a data structure according to an embodiment of the present invention.

In this embodiment of the present invention, the client obtains the content separability of the at least two pieces of information, to determine that the at least two pieces of information are content inseparable information. In this case, the at least two pieces of information are taken as a whole, and the user cannot edit one piece of information or some pieces of information in a set of the at least two pieces of information. As shown in FIG. 2, FIG. 2 is a schematic structural diagram of combination information according to this embodiment of the present invention. The user posts combination information S1, and in this case, the combination information may be a combination of multiple pieces of information posted by the user, or may be one piece of information obtained by aggregating/combining multiple pieces of information. The combination information S1 includes five pieces of information X1, X2, X3, X4, and X5. When posting the combination information S1, the user may specify a content inseparable attribute for at least two pieces of information in the combination information S1, for example, set X2, X3, and X4 as content inseparable information. After obtaining S1, a client of another user learns that X2, X3, and X4 are content inseparable information, and prompts the user that X2, X3, and X4 are content inseparable information. A specific prompter manner may be presenting the three pieces of information X2, X3, and X4 and other information distinctively or enabling edit buttons or the like of the three pieces of information X2, X3, and X4 to be in an unavailable state, which is not limited in this embodiment of the present invention. After learning the prompter, the user of the client can operate the three pieces of information X2, X3, and X4 only by taking them as a whole, and cannot separate the three pieces of information X2, X3, and X4. In a possible implementation manner, any piece or any several pieces of information in the five pieces of information X1, X2, X3, X4, and X5 included in the combination information is or are combination information that includes multiple pieces of information. In a possible implementation manner, the combination information S1 may be specifically the $i^{th}$ piece of information, that is, the five pieces of information X1, X2, X3, X4, and X5 are multiple pieces of information in the $i^{th}$ piece of information.

In an implementation manner of this embodiment of the present invention, the attribute information further includes the location adjustability, that is, the attribute information includes the content separability and the location adjustability. S105 is specifically: obtaining, by the client, the content separability and the location adjustability of the at least two pieces of information, to determine that the at least two pieces of information are content inseparable and location adjustable information. Step S106 is specifically: prompting, by the client according to the content separability and the location adjustability of the at least two pieces of information, the user that the at least two pieces of information are content inseparable and location adjustable information; and receiving, by the client, an operation instruction of the user for the at least two pieces of content inseparable and location adjustable information, and generating the to-be-posted information. Still referring to FIG. 2, the user posts combination information S1, and the combination information S1 includes five pieces of information X1, X2, X3, X4, and X5. When posting the combination information S1, the user may specify a content inseparable and location adjustable attribute for at least two pieces of information in the combination information S1. After obtaining S1, a client of another user prompts the user that the combination information S1 is content inseparable and location adjustable information, and the user cannot perform a separation edit operation on any piece or any several pieces of information in the at least two pieces of information, but can adjust a relative location of each piece of information within a whole range of the at least two pieces of information. For example, when content inseparable and location adjustable attributes are specified for three pieces of information X2, X3, and X4, when performing an edit operation, the user can edit the three pieces of information X2, X3, and X4 by taking them as a whole, cannot delete any piece of information (such as X2) or any several pieces of information (such as X2 and X3) in the three pieces of information X2, X3, and X4, cannot insert new information into the three pieces of information X2, X3, and X4 (for example, insert Y1 to obtain X2, Y1, X3, X4 or X2, X3, Y1, X4), and cannot copy or cut only any piece of information (such as X2) or any several pieces of information (such as X2 and X3) in X2, X3, and X4 to other combination information. In addition, when the three pieces of information X2, X3, and X4 are being edited, the user may adjust relative locations of X2, X3, and X4, for example, when the whole of the three pieces of information X2, X3, and X4 is being copied to new combination information, an order of the three pieces of information X2, X3, and X4 may be adjusted to X3, X2, X4 or X2, X4, X3 or the like. In a possible implementation manner, any piece or any several pieces of information in the five pieces of information X1, X2, X3, X4, and X5 included in the combination information is or are combination information that includes multiple pieces of information.

In an embodiment of the present invention, the attribute information includes the location adjustability. Step S105 includes: obtaining, by the client, the location adjustability of the at least two pieces of information in the N pieces of information, to determine that the at least two pieces of information are location nonadjustable information. Step S106 includes: prompting, by the client according to the location adjustability of the at least two pieces of information, the user that the at least two pieces of information are location nonadjustable information; and receiving, by the client, an operation instruction of the user for the at least two pieces of location nonadjustable information, and generating the to-be-posted information.

In this embodiment of the present invention, the client obtains the location adjustability of the at least two pieces of information, to determine that the at least two pieces of information are location nonadjustable information. In this case, original relative presentation locations of the at least two pieces of information need to be kept, and the user cannot adjust a relative location of to-be-presented information in a set of the at least two pieces of information. On the premise that the at least two pieces of information are location nonadjustable information, optionally, when the at least two pieces of information are content inseparable information, in this case, the at least two pieces of information can be operated only by taking them as a whole, and the user cannot adjust a relative location of each piece of information in the set of the at least two pieces of information in a process of operating the whole; optionally, when the at least two pieces of information are content separable information, in this case, the user may edit one piece or several pieces of information in the at least two pieces of information, but when information in the set of the at least two pieces of information is edited to generate the to-be-posted information, a relative location of the information that is in the set of the at least two pieces of information and is referenced in the to-be-posted information needs to keep consistent with a relative location of the information in the set of the at least two pieces of information. Specifically, still referring to FIG. 2, the user posts combination information S1, and the combination information S1 includes five pieces of information X1, X2, X3, X4, and X5. When posting the combination information S1, the user may specify a location nonadjustable attribute for at least two pieces of information in the combination information S1, for example, specify that locations of three pieces of information X2, X3, and X4 are nonadjustable. Optionally, when the user specifies that all of X2, X3, and X4 are content inseparable information, in this case, the user can edit X2, X3, and X4 only by taking them as a whole, for example, copy the whole to new combination information, and cannot adjust relative locations of X2, X3, and X4 in an editing process. Optionally, when the user specifies that all of X2, X3, and X4 are separable information, in this case, the user may edit one piece or several pieces of information in X2, X3, and X4, but when the user edits X2, X3, and X4 to generate the to-be-posted information, relative locations of X2, X3, and X4 in the to-be-posted information need to keep consistent with the relative locations of the three pieces of information X2, X3, and X4. For example, if the relative locations of the three pieces of information X2, X3, and X4 are X2, X3, X4, and the user copies all the three pieces of information X2, X3, and X4 to new combination information, and adds information Y1 and Y2 to the new combination information, in this case, regardless of how the user edits the new combination information, a principle that needs to be abided by for the to-be-posted information is keeping the relative locations (arrangement locations or presentation locations) of X2, X3, and X4 unchanged; for example, the to-be-posted information may be X2, X3, X4, Y1, Y2, may be X2, Y1, X3, X4, Y2, or may be Y1, X2, X3, Y2, X4, but cannot be combination information in which the relative locations of X2, X3, and X4 are adjusted, such as X2, X4, Y1, Y2, X3 or Y2, X4, X3, Y1, X2. In a possible implementation manner, any piece or any several pieces of information in the five pieces of information X1, X2, X3, X4, and X5 included in the combination information is or are combination information that includes multiple pieces of information.

In an implementation manner of this embodiment of the present invention, the attribute information further includes the content separability, that is, the attribute information includes the content separability and the location adjustability. Step 105 is specifically: obtaining, by the client, the content separability and the location adjustability of the at least two pieces of information in the $i^{th}$ piece of information, to determine that the at least two pieces of information are content separable and location nonadjustable information. Step S106 is specifically: prompting, by the client according to the content separability and the location adjustability of the at least two pieces of information, the user that the at least two pieces of information are content separable and location nonadjustable information; and receiving, by the client, an operation instruction of the user for the at least two pieces of content separable and location nonadjustable information, and generating the to-be-posted information. In this implementation manner, the client determines that the at least two pieces of information are content separable and location nonadjustable information, and the user may perform separation editing on one piece of information or some pieces of information in a set of the at least two pieces of information, or may edit some pieces of information in the at least two pieces of information by taking them as a whole, but needs to keep a relative location of each piece of information in the at least two pieces of information unchanged. Still referring to FIG. 2, the user posts combination information S1, and the combination information S1 includes five pieces of information X1, X2, X3, X4, and X5. When posting the combination information S1, the user may specify a content separable and location nonadjustable attribute for at least two pieces of information in the combination information S1. After obtaining S1, a client of another user prompts the user that the combination information S1 is content separable and location nonadjustable information, and the user may perform a separation edit operation on any piece or any several pieces of information in the five pieces of information X1, X2, X3, X4, and X5. When an edit operation is being performed on any two or more of the five pieces of information X1, X2, X3, X4, and X5, a relative location of each piece of information needs to be kept unchanged. For example, when three pieces of information X2, X3, and X4 are being copied to to-be-edited new combination information, it needs to be ensured that relative locations of X2, X3, and X4 are unchanged and specific editing may be copying X2, X3, and X4 by taking them as a whole, or may be keeping the relative locations of X2, X3, and X4 unchanged and inserting other information into X2, X3, and X4, for example, to obtain X2, Y1, X3, Y2, X4, on which no limitation is imposed. In a possible implementation manner, any piece or any several pieces of information in the five pieces of information X1, X2, X3, X4, and X5 included in the combination information is or are combination information that includes multiple pieces of information.

In an implementation manner of this embodiment of the present invention, the attribute information further includes the content separability, that is, the attribute information includes the content separability and the location adjustability. Step 105 is specifically: obtaining, by the client, the content separability and the location adjustability of the at least two pieces of information in the $i^{th}$ piece of information, to determine that the at least two pieces of information are content inseparable and location nonadjustable information. Step S106 is specifically: prompting, by the client according to the content separability and the location adjustability of the at least two pieces of information, the user that the at least two pieces of information are content inseparable and location nonadjustable information; and receiving, by the client, an operation instruction of the user for the at least two pieces of content inseparable and location nonadjustable information, and generating the to-be-posted information. Still referring to FIG. 2, the user posts combination information S1, and the combination information S1 includes five pieces of information X1, X2, X3, X4, and X5. When posting the combination information S1, the user may specify a content inseparable and location nonadjustable attribute for at least two pieces of information in the combination information S1. After obtaining S1, a client of another user prompts the user that the combination information S1 is content inseparable and location nonadjustable information, and the user cannot perform a separation edit operation on any piece or any several pieces of information in the at least two pieces of information. For example, when content inseparable and location nonadjustable attributes are specified for three pieces of information X2, X3, and X4, when performing an edit operation, the user can edit the three pieces of information X2, X3, and X4 by taking them as a whole (for example, copy all of X2, X3, and X4 to new combination information), cannot delete any piece of information (such as X2) or any several pieces of information (such as X2 and X3) in the three pieces of information X2, X3, and X4, cannot insert new information into the three pieces of information X2, X3, and X4 (for example, insert Y1 to obtain X2, Y1, X3, X4 or X2, X3, Y1, X4), and cannot copy or cut only any piece of information (such as X2) or any several pieces of information (such as X2 and X3) in X2, X3, and X4 to other combination information. In addition, when the three pieces of information X2, X3, and X4 are being edited, relative locations of X2, X3, and X4 cannot be adjusted, for example, when the whole of the three pieces of information X2, X3, and X4 is being copied to new combination information, an order of the three pieces of information X2, X3, and X4 cannot be adjusted to X3, X2, X4 or X2, X4, X3 or the like. In a possible implementation manner, any piece or any several pieces of information in the five pieces of information X1, X2, X3, X4, and X5 included in the combination information is or are combination information that includes multiple pieces of information.

In an embodiment of the present invention, the attribute information includes the content separability. Step S105 includes: obtaining, by the client, the content separability of the at least two pieces of information, to determine that the at least two pieces of information are content separable information. Step S106 includes: prompting, by the client according to the content separability of the at least two pieces of information, the user that the at least two pieces of information are content separable information; and receiving, by the client, an operation instruction of the user for the at least two pieces of content separable information, and generating the to-be-posted information. In this embodiment of the present invention, the client obtains the content separability of the at least two pieces of information, to determine that the at least two pieces of information are content separable information. The user may edit one piece of information or some pieces of information in a set of the at least two pieces of information, or may edit some pieces of information in the at least two pieces of information by taking them as a whole. Referring to FIG. 2, the user posts combination information S1, and the combination information S1 includes five pieces of information X1, X2, X3, X4, and X5. When posting the combination information S1, the user may specify a content separable attribute for at least two pieces of information in the combination information S1. After obtaining S1, a client of another user prompts the user that the combination information S1 is content separable information, and the user may perform an edit operation on any piece or any several pieces of information in the five pieces of information X1, X2, X3, X4, and X5, to generate the to-be-posted information. A specific prompt manner may be enabling edit buttons of the five pieces of information X1, X2, X3, X4, and X5 to be in an available state. In a possible implementation manner, any piece or any several pieces of information in the five pieces of information X1, X2, X3, X4, and X5 included in the combination information is or are combination information that includes multiple pieces of information.

Figure 4:
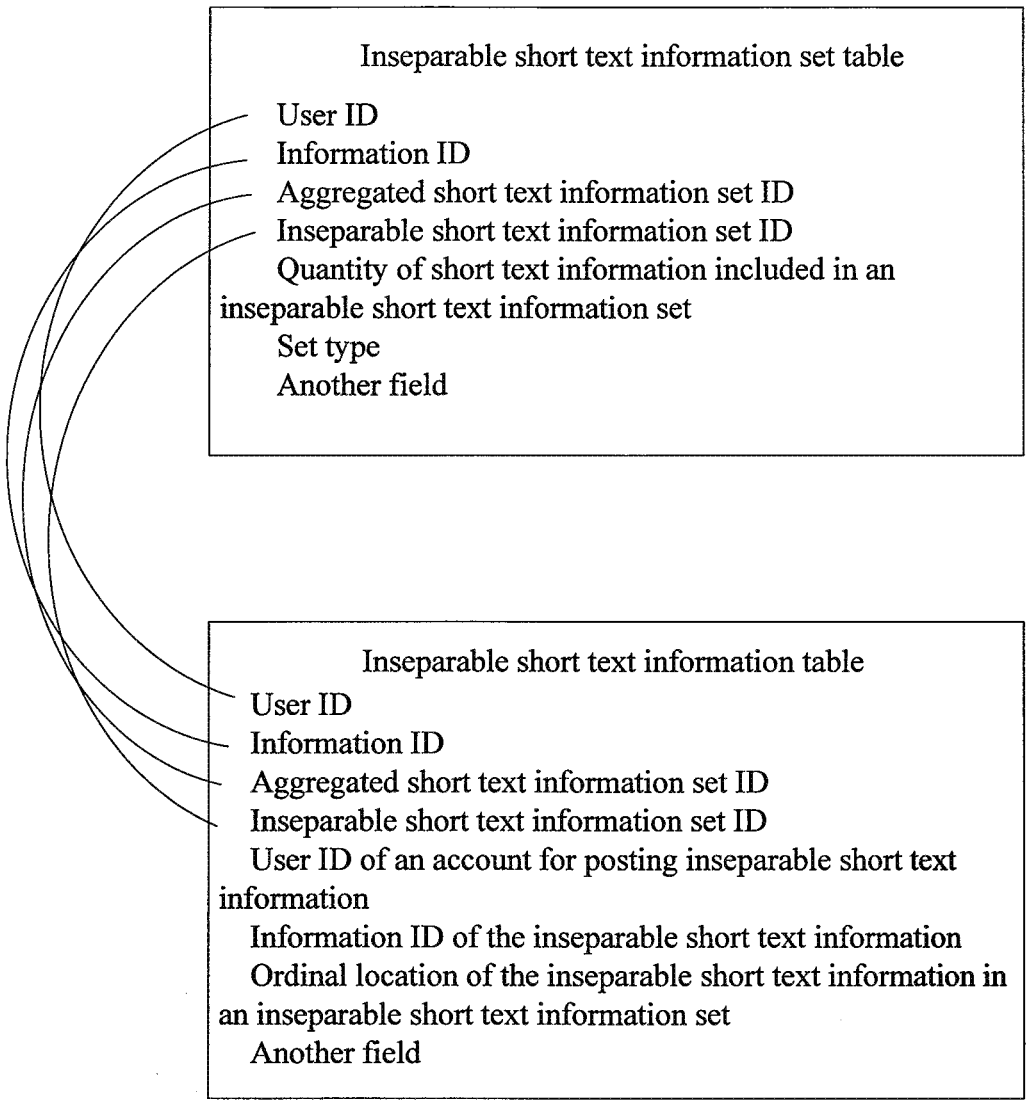
FIG. 4 is a schematic diagram of a data structure according to an embodiment of the present invention.

In the foregoing embodiment of the present invention, schematic diagrams of data structures or a schematic diagram of a data structure shown in FIG. 3 and/or FIG. 4 may be stored in a database at a server end. The schematic diagram of the data structure may include a short text information table, an aggregated short text information set table, and an aggregated short text information table. The short text information table is used to record related attributes of short text information sent by a client. The aggregated short text information table is used to record related attributes of aggregated short text information sent by the client, and the aggregated short text information includes at least two aggregated short texts, for example, includes an aggregated short text A, an aggregated short text B, and an aggregated short text C. The aggregated short text information set table is used to record related attributes of aggregated short texts included in aggregated short text information, for example, related attributes of the foregoing aggregated short text A or related attributes of the foregoing aggregated short text B. It should be understood that in this embodiment of the present invention, a meaning of aggregation is the same as that of combination. When attribute information of one piece of combination information is being determined, a field value in a corresponding table may be obtained to determine whether at least two pieces of information included in the piece of combination information can be separated and whether locations of the at least two pieces of information can be adjusted. It should be noted that during information interaction between the client and a server, in an embodiment, the foregoing information, a data structure that represents an attribute and the like of the information, and the like may be stored in a database of the server, and the server or the client obtains the attribute and the like of the information by reading a corresponding field and the like in the database. In an optional implementation manner, in a system that includes the server and the client or a system that includes clients in the following description, by means of corresponding specific character setting or another identifier with an identification function, attributes and the like of information may be differentiated from each other and are easy to be stored and read.

In the short text information table, a field "composition protection type" is set, and when the information is combination information, content separability of at least two pieces of information in the combination information may be determined by setting/reading a value of the field "composition protection type". For example, when the value of the field "composition protection type" is 1, the at least two pieces of information in the combination information are content inseparable information, that is, a user cannot delete any piece or any several pieces of information in the at least two pieces of information, the user cannot insert other information into the at least two pieces of information, and the user cannot separate one piece of information or several pieces of information in the at least two pieces of information and add the piece of information or the several pieces of information to combination information that is to be newly edited, but the user can take the at least two pieces of information as a whole, and completely add the at least two pieces of information to the combination information that is to be newly edited.

In the aggregated short text information set table, a field "type" is set, and when the information is combination information, content separability of at least two pieces of information in the combination information may be determined by reading a value of the field "type". For example, when the value of the field "type" is 1, the at least two pieces of information in the combination information are content inseparable information, but the user can take the at least two pieces of information as a whole, and completely add the at least two pieces of information to combination information that is to be newly edited. In a possible implementation manner, the at least two pieces of information in the combination information are all information included in the combination information, that is, the at least two pieces of information are the combination information. In a possible implementation manner, when the user copies at least two pieces of information whose field "type" is assigned a value 1, and uses the at least two pieces of information as a set for combination information that is to be newly edited, a value of a field "type" of the information set that includes the at least two pieces of information may be set to 2 in a corresponding aggregated short text information set table; in this case, the user is not allowed to edit or modify the information set that includes the at least two pieces of information. Specifically, when the user copies the set (such as X1, X2, X3) of the at least two pieces of information whose field "type" is assigned the value 1, and uses the set (such as X1, X2, X3) of the at least two pieces of information in one piece of combination information (such as X1, X2, X3, Y1, Y2, Y3) being edited by the user, the value of the corresponding field "type" of the copied set (X1, X2, X3) of the at least two pieces of information in the aggregated short text information set table is set to 2. In this case, attribute information of the set (X1, X2, X3) of the at least two pieces of information is a content inseparable information set and a location nonadjustable information set, the user cannot delete one piece or several pieces of information in the set of the at least two pieces of information, cannot insert other information into the at least two pieces of information, and cannot adjust a relative location of any piece of information in the set of the at least two pieces of information; on a presentation interface of the client, the user cannot separate one piece of information or several pieces of information in the at least two pieces of information and add the piece of information or the several pieces of information to combination information that is to be newly edited, either. In a possible implementation manner, when the user copies at least two pieces of information whose field "type" is assigned a value 1, and uses the at least two pieces of information as a short text information set for combination information that is to be newly edited, a value of a field "type" of the information set that includes the at least two pieces of information may be set to 3 in an aggregated short text information set table corresponding to the combination information that is to be newly edited; in this case, attribute information of the set of the at least two pieces of information is a content inseparable information set and a location adjustable information set, and the user cannot perform a separation operation on the at least two pieces of information, but can adjust a relative location, in the set of the at least two pieces of information, of each piece of information in the set of the at least two pieces of information. In another possible implementation manner of this embodiment of the present invention, a value may be further assigned to the field "type" according to segmentation of the content separability attribute. The content separability attribute may be segmented into content deletability (used to identify whether any piece or any several pieces of information in the at least two pieces of information can be deleted), content insertability (used to identify whether other information can be inserted into the at least two pieces of information), and content non-whole editability (used to identify whether separation editing can be performed on one piece or several pieces of information in the at least two pieces of information). For example, a field "type" of at least two pieces of information in one piece of combination information is set to 4, which indicates that the at least two pieces of information are content undeletable information; a field "type" of at least two pieces of information in one piece of combination information is set to 5, which indicates that the at least two pieces of information are content insertable information; "type" of at least two pieces of information in one piece of combination information is set to 6, which indicates that the at least two pieces of information are content non-whole non-editability information. In this possible implementation manner, multiple values may be assigned to the field "type" according to a location adjustability attribute, so that the field "type" meets a combination of multiple features described in this embodiment. It should be noted that in this embodiment of the present invention, various changes that are of attribute information of at least two pieces of information and/or new edited information and are caused by field value changes when the at least two pieces of information are copied to generate the new edited information are further included. Various specific cases cannot be enumerated, and the foregoing is merely exemplary, but this embodiment of the present invention should cover various specific change solutions.

In the aggregated short text information table, a field "inseparable short text information set id" is set, and when the information is combination information, content separability of at least two pieces of information in the combination information may be determined by reading a value of the field "inseparable short text information set ID". In a possible implementation manner, the at least two pieces of information in the combination information are all information included in the combination information. When the value of the field "inseparable short text information set ID" is null, a set of the at least two pieces of information does not belong to any inseparable short text information set. In this case, if there is no other limitation, the user may edit the set of the at least two pieces of information on a presentation interface that is of the client and that is for presenting the set of the at least two pieces of information; for example, choose to add one piece or several pieces of information in the set of the at least two pieces of information to another piece of combination information that is to be edited by the user. When the value of the field "inseparable short text information set id" is not null, a set of the at least two pieces of information belongs to an inseparable short text information set that is set by the user that edits the set of the at least two pieces of information, and the at least two pieces of information are content inseparable information. If the user needs to perform an operation on the at least two pieces of information, the user can take the at least two pieces of information only as a whole, and completely add the at least two pieces of information to combination information that is to be newly edited. A corresponding inseparable short text information set may be determined from a corresponding aggregated short text information set according to "inseparable short text information set id". In this embodiment, a corresponding inseparable short text information set may be determined uniquely according to a user id, an information ID, an aggregated short text information set id, and an inseparable short text information set id.

Referring to FIG. 4, in an inseparable short text information set table, a field "set type" is set, and when the information is combination information, attribute information of at least two pieces of information in the combination information may be determined by reading a value of the field "set type". When the value of the field "set type" is 1, the at least two pieces of information in the combination information are content inseparable and location nonadjustable information. When adding a piece of short text information in a set of the at least two pieces of information to another piece of combination information, the user not only needs to add all short text information in the set of the at least two pieces of information to the new combination information, but also cannot adjust a relative ordinal location of each piece of short text information in the set of the at least two pieces of information. When the value of the field "set type" is 2, the at least two pieces of information in the combination information are content inseparable and location adjustable information. When adding a piece of short text information in a set of the at least two pieces of information to another piece of combination information, the user needs to add all short text information in the set of the at least two pieces of information to the new combination information, but can adjust a relative ordinal location of each piece of short text information in the set of the at least two pieces of information. In a possible implementation manner, the at least two pieces of information in the combination information are all information included in the combination information, that is, the at least two pieces of information are the combination information. Corresponding short text information may be determined from a short text information table according to a user id of an account for posting inseparable short text information and an information ID of the inseparable short text information, where the user id and the information ID are in an inseparable short text information table. A field "ordinal location of inseparable short text information in an inseparable short text information set" is used to record a relative location of each piece of short text information in an inseparable short text information set.

Figure 5:
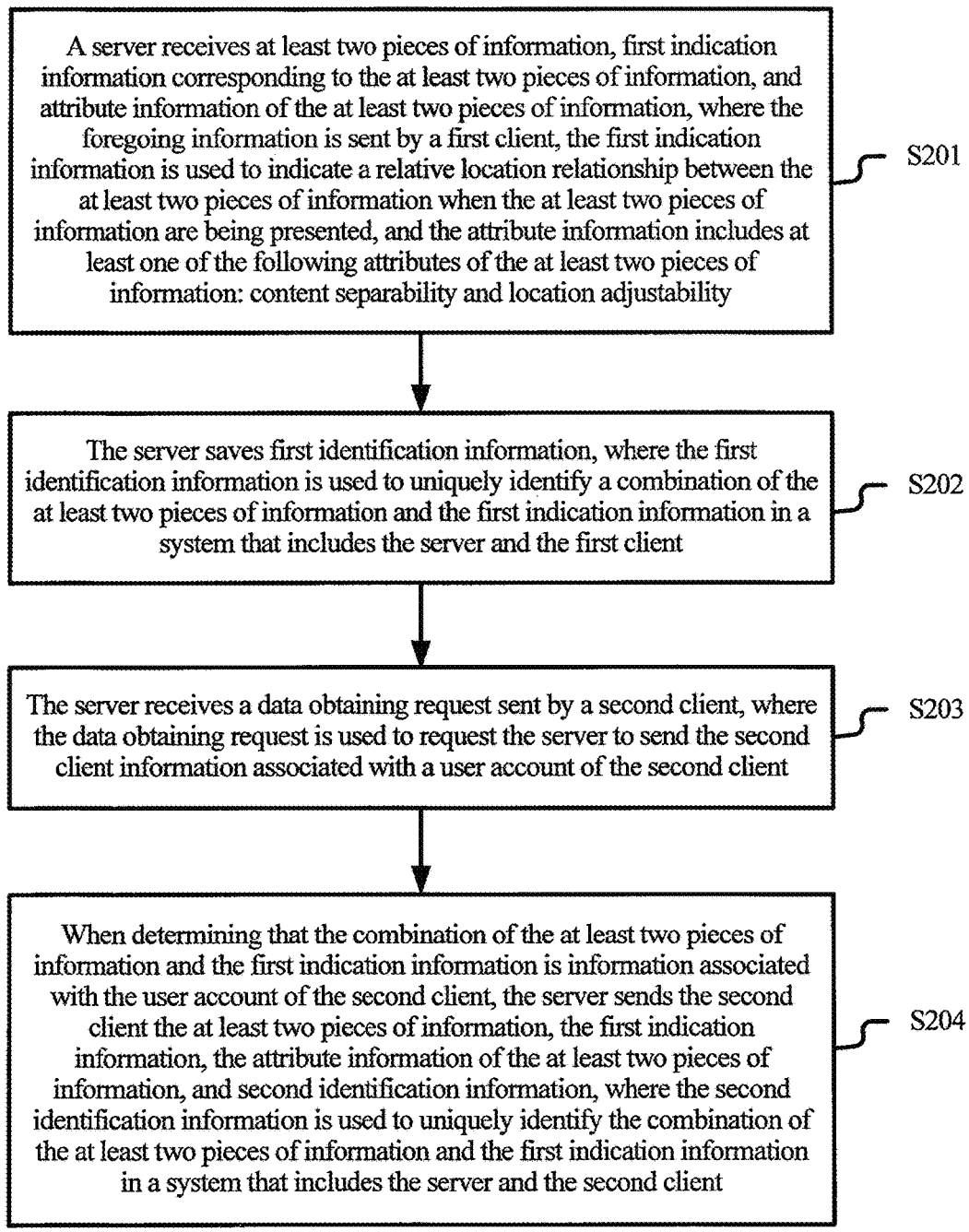
FIG. 5 is a schematic flowchart of an information transferring method according to an embodiment of the present invention.

Referring to FIG. 5, FIG. 5 is a flowchart of an information transfer method according to an embodiment of the present invention. The method is executed by a server, and the method includes the following steps:

S201. The server receives at least two pieces of information, first indication information corresponding to the at least two pieces of information, and attribute information of the at least two pieces of information, where the foregoing information is sent by a first client, the first indication information is used to indicate a relative location relationship between the at least two pieces of information when the at least two pieces of information are being presented, and the attribute information includes at least one of the following attributes of the at least two pieces of information: content separability or location adjustability.

Optionally, the at least two pieces of information may be at least two pieces of information in N pieces of information sent by the first client. Optionally, the at least two pieces of information may be at least two pieces of information in multiple pieces of information included in one piece of combination information sent by the first client. Further, the at least two pieces of information may be all information in a set to which the at least two pieces of information belong, that is, may be the N pieces of information sent by the first client; or all information in the piece of combination information sent by the first client. Accordingly, the first indication information may be used to indicate a relative location relationship between the at least two pieces of information when the at least two pieces of information in the N pieces of information are being presented, or used to indicate a relative location relationship between the at least two pieces of information when the at least two pieces of information in the multiple pieces of information included in the piece of combination information are being presented.

S202. The server saves first identification information, where the first identification information is used to uniquely identify a combination of the at least two pieces of information and the first indication information in a system that includes the server and the first client.

Optionally, after the server receives the attribute information that is of the at least two pieces of information and sent by the first client, the server may save the attribute information of the at least two pieces of information, and determine that the content separability and the location adjustability of the at least two pieces of information. The server may associate the first identification information with the attribute information of the at least two pieces of information, or optionally, the server may independently set a field of the attribute information of the at least two pieces of information in the first identification information.

S203. The server receives a data obtaining request sent by a second client, where the data obtaining request is used to request the server to send the second client information associated with a user account of the second client.

S204. When determining that the combination of the at least two pieces of information and the first indication information is information associated with the user account of the second client, the server sends the second client the at least two pieces of information, the first indication information, the attribute information of the at least two pieces of information, and second identification information, where the second identification information is used to uniquely identify the combination of the at least two pieces of information and the first indication information in a system that includes the server and the second client.

Optionally, the first identification information and the second identification information are the same, and are used to uniquely identify the combination of the at least two pieces of information and the first indication information in a system that includes the server, the first client, and the second client. Optionally, a corresponding database may be set on the first client, the second client, and the server, and same or corresponding attribute information fields are set in the database, so that a corresponding apparatus reads the attribute information of the at least two pieces of information. Optionally, a database may be set only on the server; in a process in which the server determines the attribute information of the at least two pieces of information and sends the at least two pieces of information to the clients, the server sends the clients a value assigned to a corresponding field for the at least two pieces of information, and after obtaining the corresponding field, the clients learn the attribute information of the at least two pieces of information.

In an embodiment of the present invention, step 204 includes: when determining that the combination of the at least two pieces of information and the first indication information is information associated with the user account of the second client, obtaining, by the server, the attribute information of the at least two pieces of information according to a preset rule, and generating a file in a predetermined format, where the file in the predetermined format includes the at least two pieces of information, the second identification information, setting that is of relative locations of the at least two pieces of information when the at least two pieces of information are being presented and that is set according to the first indication information, and setting that is of a format of the at least two pieces of information when the at least two pieces of information are being presented and that is set according to the attribute information of the at least two pieces of information; and sending, by the server, the file in the predetermined format to the second client. For the format in a case of presentation, reference may be made to a form of presentation of at least two pieces of information on a terminal in the foregoing embodiment. A specific file format may be created between the server and the second client. By using the preset format, the server or the second client may obtain related information of the at least two pieces of information, or may quickly read related information of the at least two pieces of information, so as to improve information obtaining efficiency. Further, the file in the predetermined format is a Hypertext Markup Language text.

Figure 6:
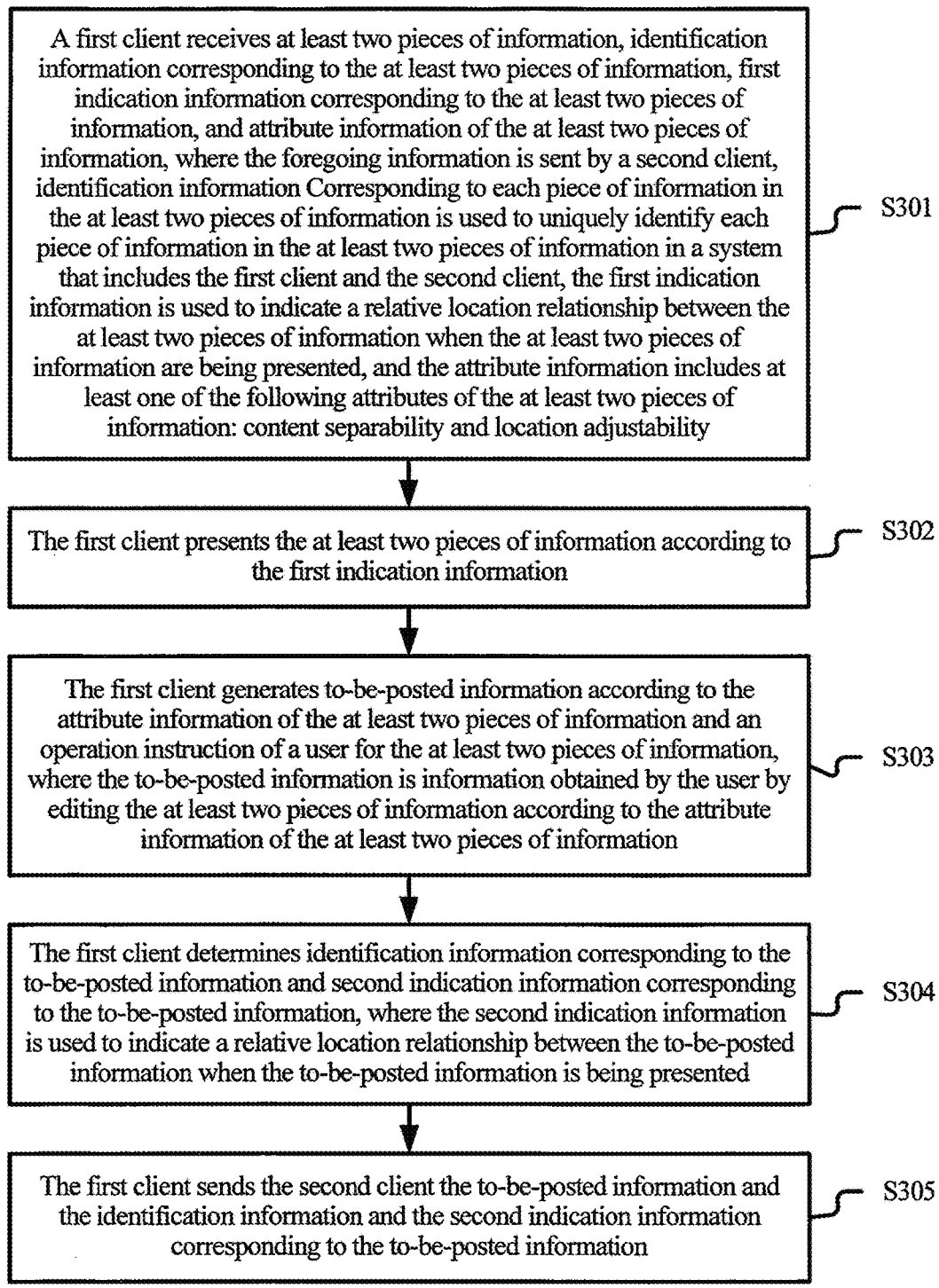
FIG. 6 is a schematic flowchart of an information transferring method according to an embodiment of the present invention.

Referring to FIG. 6, FIG. 6 is a flowchart of an information transfer method according to an embodiment of the present invention. The method is executed by a client. A difference between this embodiment and the embodiment of the present invention described in FIG. 1 lies in that a scenario to which the embodiment of the present invention described in the FIG. 1 is applied is a system that includes a client and a server, that is, interaction between the client and the server, and a scenario to which this embodiment of the present invention is applied is interaction between clients. A possible form of this embodiment of the present invention is interaction between clients by using a server. For this embodiment of the present invention, reference may be made to the embodiment described in FIG. 1 for same or corresponding technical features. Specifically, the method includes the following steps:

S301. The first client receives at least two pieces of information, identification information corresponding to the at least two pieces of information, first indication information corresponding to the at least two pieces of information, and attribute information of the at least two pieces of information, where the foregoing information is sent by a second client, identification information corresponding to each piece of information in the at least two pieces of information is used to uniquely identify each piece of information in the at least two pieces of information in a system that includes the first client and the second client, the first indication information is used to indicate a relative location relationship between the at least two pieces of information when the at least two pieces of information are being presented, and the attribute information includes at least one of the following attributes of the at least two pieces of information: content separability or location adjustability.

The at least two pieces of information may be at least two pieces of information included in one piece of combination information sent by the second client to the first client, and accordingly, in this case, the identification information corresponding to the at least two pieces of information may be identification information corresponding to the piece of combination information; or the at least two pieces of information may be at least two pieces of information in N pieces of information sent by the second client to the first client, and accordingly, in this case, the identification information corresponding to the at least two pieces of information may be identification information corresponding to each piece of information in the at least two pieces of information, on which no limitation is imposed.

S302. The first client presents the at least two pieces of information according to the first indication information.

S303. The first client generates to-be-posted information according to the attribute information of the at least two pieces of information and an operation instruction of a user for the at least two pieces of information, where the to-be-posted information is information obtained by the user by editing the at least two pieces of information according to the attribute information of the at least two pieces of information.

S304. The first client determines identification information corresponding to the to-be-posted information and second indication information corresponding to the to-be-posted information, where the second indication information is used to indicate a relative location relationship between the to-be-posted information when the to-be-posted information is being presented.

S305. The first client sends the second client the to-be-posted information and the identification information and the second indication information corresponding to the to-be-posted information.

In this embodiment of the present invention, attribute information of combination information is set and determined, so that in a system that includes clients, information posted by a user may be utilized to a specific extent according to a utilization rule preset by the user, which reduces information utilization randomness, protects lawful rights of an information publisher, and enhances user experience of the information publisher.

In an embodiment of the present invention, the attribute information is the content separability. Before step S303, the method further includes: obtaining, by the first client, the content separability of the at least two pieces of information, to determine that the at least two pieces of information are content inseparable information. Step 303 includes: prompting, by the first client according to the content separability of the at least two pieces of information, the user that the at least two pieces of information are content inseparable information; and receiving, by the first client, the operation instruction of the user for the at least two pieces of content inseparable information, and generating the to-be-posted information.

In an embodiment of the present invention, the attribute information is the location adjustability. Before step S303, the method further includes: obtaining, by the first client, the location adjustability of the at least two pieces of information, to determine that the at least two pieces of information are location nonadjustable information. Step 303 includes: prompting, by the first client according to the location adjustability of the at least two pieces of information, the user that the at least two pieces of information are location nonadjustable information; and receiving, by the first client, the operation instruction of the user for the at least two pieces of location nonadjustable information, and generating the to-be-posted information.

In an embodiment of the present invention, the attribute information is the content separability and the location adjustability. Before step S303, the method further includes: obtaining, by the first client, the content separability and the location adjustability of the at least two pieces of information, to determine that the at least two pieces of information are content separable and location nonadjustable information. Step 303 includes: prompting, by the first client according to the content separability and the location adjustability of the at least two pieces of information, the user that the at least two pieces of information are content separable and location nonadjustable information; and receiving, by the first client, the operation instruction of the user for the at least two pieces of content separable and location nonadjustable information, and generating the to-be-posted information.

In an embodiment of the present invention, the attribute information is the content separability and the location adjustability. Before step S303, the method further includes: obtaining, by the first client, the content separability and the location adjustability of the at least two pieces of information, to determine that the at least two pieces of information are content inseparable and location nonadjustable information. Step 303 includes: prompting, by the first client according to content separability and the location adjustability of the at least two pieces of information, the user that the at least two pieces of information are content inseparable and location nonadjustable information; and receiving, by the first client, the operation instruction of the user for the at least two pieces of content inseparable and location nonadjustable information, and generating the to-be-posted information.

In an embodiment of the present invention, the attribute information is the content separability and the location adjustability. Before step S303, the method further includes: obtaining, by the first client, the content separability and the location adjustability of the at least two pieces of information, to determine that the at least two pieces of information are content inseparable and location adjustable information; Step S303 includes prompting, by the first client according to the content separability and the location adjustability of the at least two pieces of information, the user that the at least two pieces of information are content inseparable and location adjustable information; and receiving, by the first client, the operation instruction of the user for the at least two pieces of content inseparable and location adjustable information, and generating the to-be-posted information.

In an embodiment of the present invention, the at least two pieces of information are at least two pieces of information included in one piece of combination information sent by the second client, and the identification information corresponding to the at least two pieces of information is identification information corresponding to the piece of combination information.

In an embodiment of the present invention, step S301 includes: receiving, by the first client, the at least two pieces of information, the identification information corresponding to each piece of information in the at least two pieces of information, the first indication information corresponding to the at least two pieces of information, and the attribute information of the at least two pieces of information, where the foregoing information is sent by the second client by using a server. Step S305 includes: sending, by the first client by using the server, the second client the to-be-posted information, the identification information corresponding to the to-be-posted information, and the second indication information.

In an embodiment of the present invention, before step S305, the method further includes: obtaining, by the first client, a setting instruction of the user for attribute information of the to-be-posted information, and determining the attribute information of the to-be-posted information; or setting, by the first client, attribute information of the to-be-posted information according to a preset rule. Step S305 includes: sending, by the first client, the second client the to-be-posted information, the identification information and the second indication information corresponding to the to-be-posted information, and the attribute information of the to-be-posted information.

Figure 7:
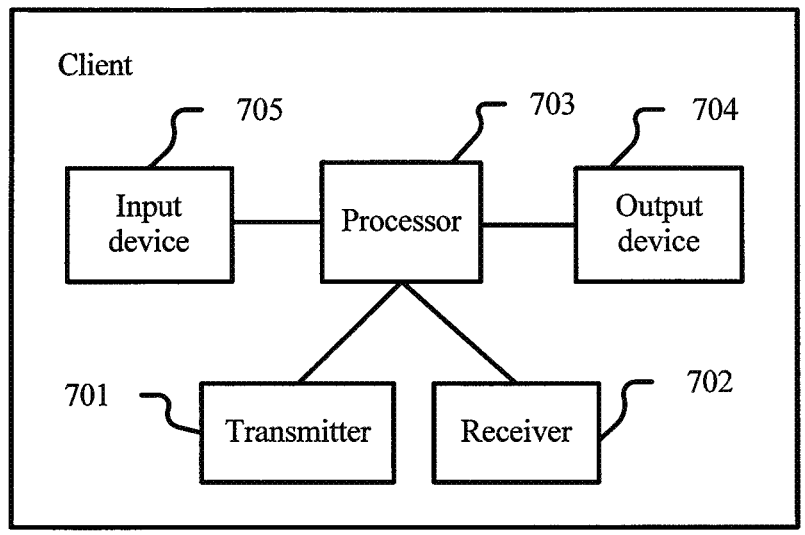
FIG. 7 is a schematic structural diagram of a client according to an embodiment of the present invention.

Referring to FIG. 7, FIG. 7 is a client according to an embodiment of the present invention. The client may be configured to execute method steps shown in FIG. 1, and for details of the method steps, reference may be made to the method embodiment. The client includes a transmitter 701, a receiver 702, a processor 703, an output device 704, and an input device 705, the transmitter 701 is connected to the processor 703, the receiver 702 is connected to the processor 703, the output device 704 is connected to the processor 703, and the input device 705 is connected to the processor 703; where the transmitter 701 is configured to send a data obtaining request to a server, where the data obtaining request is used to obtain information associated with a user account of the client;

the receiver 702 is configured to receive N pieces of information and N pieces of corresponding identification information sent by the server according to the data obtaining request, where the N pieces of identification information are used to respectively and uniquely identify the N pieces of information in a system that includes the client and the server, and N is an integer greater than or equal to 2;

the output device 704 is configured to: when the $i^{th}$ piece of information in the N pieces of information is combination information that includes multiple pieces of information, present, according to first indication information corresponding to the $i^{th}$ piece of information, the multiple pieces of information included in the $i^{th}$ piece of information, where the first indication information is used to indicate a relative location relationship among the multiple pieces of information included in the $i^{th}$ piece of information when the multiple pieces of information included in the piece of information are being presented; or when the $i^{th}$ piece of information in the N pieces of information is non-combination information, present the $i^{th}$ piece of information, where i is an integer greater than or equal to 1 and less than or equal to N;

the processor 703 is configured to obtain attribute information of at least two pieces of information in the N pieces of information, where the attribute information includes at least one of the following attributes of the at least two pieces of information: content separability or location adjustability;

the input device 705 is configured to obtain an operation instruction of a user for the at least two pieces of information;

the processor 703 is further configured to generate to-be-posted information according to the attribute information of the at least two pieces of information and the operation instruction of the user for the at least two pieces of information, where the to-be-posted information is information obtained by the user by editing the at least two pieces of information according to the attribute information of the at least two pieces of information;

the processor 703 is further configured to determine identification information corresponding to the to-be-posted information and second indication information corresponding to the to-be-posted information; and the transmitter 701 is further configured to: after the processor 703 determines the identification information corresponding to the to-be-posted information and the second indication information corresponding to the to-be-posted information, send the server the identification information and the second indication information corresponding to the to-be-posted information.

In an embodiment of the present invention, the attribute information includes the content separability. The processor is specifically configured to obtain the content separability of the at least two pieces of information in the N pieces of information, to determine that the at least two pieces of information are content inseparable information. The output device is further configured to: when the processor determines that the at least two pieces of information are content inseparable information, prompt the user that the at least two pieces of information are content inseparable information. The input device is specifically configured to receive an operation instruction of the user for the at least two pieces of content inseparable information. The processor is specifically configured to generate the to-be-posted information according to the operation instruction that is of the user for the at least two pieces of content inseparable information and is received by the input device.

In an embodiment of the present invention, the attribute information includes the location adjustability. The processor is specifically configured to obtain the location adjustability of the at least two pieces of information in the N pieces of information, to determine that the at least two pieces of information are location nonadjustable information. The output device is further configured to: when the processor determines that the at least two pieces of information are location nonadjustable information, prompt the user that the at least two pieces of information are location nonadjustable information. The input device is specifically configured to receive an operation instruction of the user for the at least two pieces of location nonadjustable information. The processor is specifically configured to generate the to-be-posted information according to the operation instruction that is of the user for the at least two pieces of location nonadjustable information and is received by the input device.

In an embodiment of the present invention, the attribute information includes the content separability and the location adjustability. The processor is specifically configured to obtain the content separability and the location adjustability of the at least two pieces of information in the N pieces of information, to determine that the at least two pieces of information are content separable and location nonadjustable information. The output device is further configured to: when the processor determines that the at least two pieces of information are content separable and location nonadjustable information, prompt the user that the at least two pieces of information are content separable and location nonadjustable information. The input device is specifically configured to receive an operation instruction of the user for the at least two pieces of content separable and location nonadjustable information. The processor is specifically configured to generate the to-be-posted information according to the operation instruction that is of the user for the at least two pieces of content separable and location nonadjustable information and is received by the input device.

In an embodiment of the present invention, the attribute information includes the content separability and the location adjustability. The processor is specifically configured to obtain the content separability and the location adjustability of the at least two pieces of information in the N pieces of information, to determine that the at least two pieces of information are content inseparable and location nonadjustable information. The output device is further configured to: when the processor determines that the at least two pieces of information are content inseparable and location nonadjustable information, prompt the user that the at least two pieces of information are content inseparable and location nonadjustable information. The input device is specifically configured to receive an operation instruction of the user for the at least two pieces of content inseparable and location nonadjustable information. The processor is specifically configured to generate the to-be-posted information according to the operation instruction that is of the user for the at least two pieces of content inseparable and location nonadjustable information and is received by the input device.

In an embodiment of the present invention, the attribute information includes the content separability and the location adjustability. The processor is specifically configured to obtain the content separability and the location adjustability of the at least two pieces of information in the N pieces of information, to determine that the at least two pieces of information are content inseparable and location adjustable information. The output device is further configured to: when the processor determines that the at least two pieces of information are content inseparable and location adjustable information, prompt the user that the at least two pieces of information are content inseparable and location adjustable information. The input device is specifically configured to receive an operation instruction of the user for the at least two pieces of content inseparable and location adjustable information. The processor is specifically configured to generate the to-be-posted information according to the operation instruction that is of the user for the at least two pieces of content inseparable and location adjustable information and is received by the input device.

In an embodiment of the present invention, at least one piece of information in the at least two pieces of information is combination information that includes multiple pieces of information.

In an embodiment of the present invention, the $i^{th}$ piece of information in the N pieces of information is combination information that includes multiple pieces of information. The processor is specifically configured to: obtain attribute information of at least two pieces of information in the $i^{th}$ piece of information, and generate to-be-posted information according to the attribute information of the at least two pieces of information and an operation instruction of the user for the at least two pieces of information in the $i^{th}$ piece of information.

Further, the at least two pieces of information in the $i^{th}$ piece of information are specifically all information included in the $i^{th}$ piece of information.

In an embodiment of the present invention, the processor is further configured to: before the transmitter sends the server the identification information and the second indication information corresponding to the to-be-posted information, determine attribute information of the to-be-posted information according to a setting instruction of the user for the attribute information of the to-be-posted information; or set attribute information of the to-be-posted information according to a preset rule. The transmitter is specifically configured to send the server the identification information and the second indication information corresponding to the to-be-posted information and the attribute information of the to-be-posted information.

Figure 8:
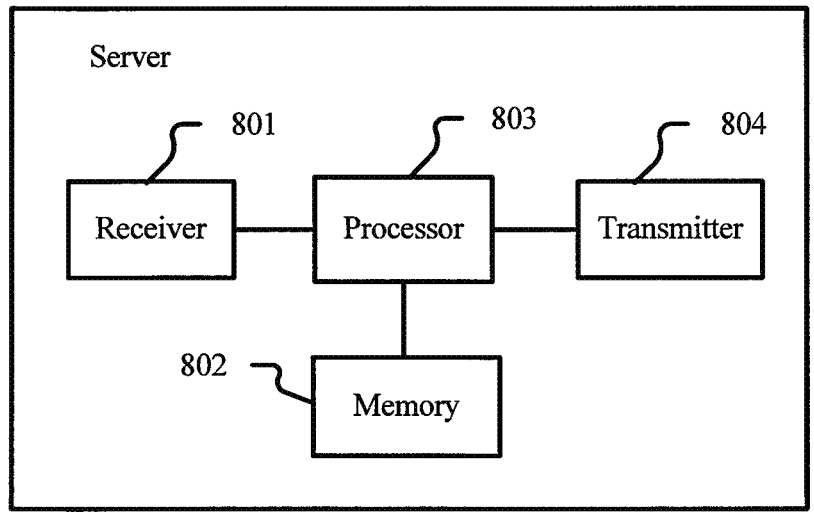
FIG. 8 is a schematic structural diagram of a server according to an embodiment of the present invention.

Referring to FIG. 8, FIG. 8 is a server according to an embodiment of the present invention. The server may be configured to execute method steps shown in FIG. 5, and for details of the method steps, reference may be made to the method embodiment. The server includes a receiver 801, a memory 802, a processor 803, and a transmitter 804, the receiver 801 is connected to the processor 803, the memory 802 is connected to the processor 803, and the transmitter 804 is connected to the processor 803; where the receiver 801 is configured to receive at least two pieces of information, first indication information corresponding to the at least two pieces of information, and attribute information of the at least two pieces of information, where the foregoing information is sent by a first client, the first indication information is used to indicate a relative location relationship between the at least two pieces of information when the at least two pieces of information are being presented, and the attribute information includes at least one of the following attributes of the at least two pieces of information: content separability or location adjustability;

the memory 802 is configured to save first identification information, where the first identification information is used to uniquely identify a combination of the at least two pieces of information and the first indication information in a system that includes the server and the first client;

the receiver 801 is further configured to receive a data obtaining request sent by a second client, where the data obtaining request is used to request the server to send the second client information associated with a user account of the second client;

the processor 803 is configured to determine whether the combination of the at least two pieces of information and the first indication information is associated with the user account of the second client; and the transmitter 804 is configured to: when the processor 803 determines that the combination of the at least two pieces of information and the first indication information is information associated with the user account of the second client, send the second client the at least two pieces of information, the first indication information, the attribute information of the at least two pieces of information, and second identification information, where the second identification information is used to uniquely identify the combination of the at least two pieces of information and the first indication information in a system that includes the server and the second client.

In an embodiment of the present invention, the processor is further configured to: when determining that the combination of the at least two pieces of information and the first indication information is information associated with the user account of the second client, generate a file in a predetermined format according to a preset rule and the attribute information of the at least two pieces of information, where the file in the predetermined format includes the at least two pieces of information, the second identification information, setting that is of relative locations of the at least two pieces of information when the at least two pieces of information are being presented and that is set according to the first indication information, and setting that is of a format of the at least two pieces of information when the at least two pieces of information are being presented and that is set according to the attribute information of the at least two pieces of information; and the transmitter is specifically configured to send the file in the predetermined format to the second client.

Further, the file in the predetermined format may be a Hypertext Markup Language file.

In an embodiment of the present invention, the at least two pieces of information are at least two pieces of information included in one piece of combination information sent by the first client.

Figure 9:
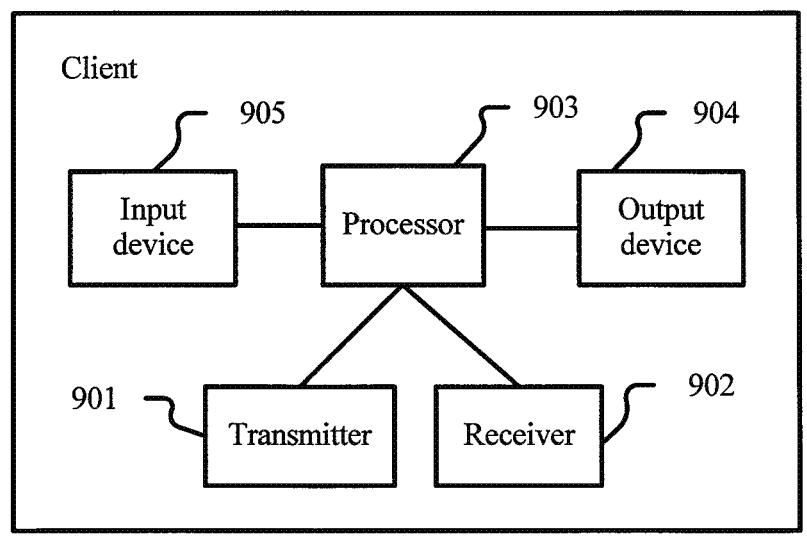
FIG. 9 is a schematic structural diagram of a client according to an embodiment of the present invention.

Referring to FIG. 9, FIG. 9 is a client according to an embodiment of the present invention. The client may be configured to execute method steps shown in FIG. 6, and for details of the method steps, reference may be made to the method embodiment. The client includes a transmitter 901, a receiver 902, an output device 904, an input device 905, and a processor 903, the receiver 902 is connected to the processor 903, the input device 905 is connected to the processor 903, the output device 904 is connected to the processor 903, and the transmitter 901 is connected to the processor 903; where the receiver 902 is configured to receive at least two pieces of information, identification information corresponding to the at least two pieces of information, first indication information corresponding to the at least two pieces of information, and attribute information of the at least two pieces of information, where the foregoing information is sent by a second client, identification information corresponding to each piece of information in the at least two pieces of information is used to uniquely identify each piece of information in the at least two pieces of information in a system that includes the first client and the second client, the first indication information is used to indicate a relative location relationship between the at least two pieces of information when the at least two pieces of information are being presented, and the attribute information includes at least one of the following attributes of the at least two pieces of information: content separability or location adjustability;

the output device 904 is configured to present the at least two pieces of information according to the first indication information;

the input device 905 is configured to obtain an operation instruction of a user for the at least two pieces of information;

the processor 903 is configured to generate to-be-posted information according to the attribute information of the at least two pieces of information and the operation instruction of the user for the at least two pieces of information, where the to-be-posted information is information obtained by the user by editing the at least two pieces of information according to the attribute information of the at least two pieces of information;

the processor 903 is further configured to determine identification information corresponding to the to-be-posted information and second indication information corresponding to the to-be-posted information, where the second indication information is used to indicate a relative location relationship between the to-be-posted information when the to-be-posted information is being presented; and the transmitter 901 is configured to send the second client the to-be-posted information and the identification information and the second indication information corresponding to the to-be-posted information.

In an embodiment of the present invention, the attribute information is the content separability. The processor is further configured to: before generating the to-be-posted information according to the attribute information of the at least two pieces of information and the operation instruction of the user for the at least two pieces of information, obtain the content separability of the at least two pieces of information, to determine that the at least two pieces of information are content inseparable information. The output device is further configured to prompt, according to the content separability of the at least two pieces of information, the user that the at least two pieces of information are content inseparable information. The input device is specifically configured to receive an operation instruction of the user for the at least two pieces of content inseparable information. The processor is specifically configured to generate the to-be-posted information according to the operation instruction of the user for the at least two pieces of content inseparable information.

In an embodiment of the present invention, the attribute information is the location adjustability. The processor is further configured to: before generating the to-be-posted information according to the attribute information of the at least two pieces of information and the operation instruction of the user for the at least two pieces of information, obtain the location adjustability of the at least two pieces of information, to determine that the at least two pieces of information are location nonadjustable information. The output device is further configured to prompt, according to the location adjustability of the at least two pieces of information, the user that the at least two pieces of information are location nonadjustable information. The input device is specifically configured to receive an operation instruction of the user for the at least two pieces of location nonadjustable information. The processor is specifically configured to generate the to-be-posted information according to the operation instruction of the user for the at least two pieces of location nonadjustable information.

In an embodiment of the present invention, the attribute information is the content separability and the location adjustability. The processor is further configured to: before generating the to-be-posted information according to the attribute information of the at least two pieces of information and the operation instruction of the user for the at least two pieces of information, obtain the content separability and the location adjustability of the at least two pieces of information, to determine that the at least two pieces of information are content separable and location nonadjustable information. The output device is further configured to prompt, according to the content separability and the location adjustability of the at least two pieces of information, the user that the at least two pieces of information are content separable and location nonadjustable information. The input device is specifically configured to receive an operation instruction of the user for the at least two pieces of content separable and location nonadjustable information. The processor is specifically configured to generate the to-be-posted information according to the operation instruction of the user for the at least two pieces of content separable and location nonadjustable information.

In an embodiment of the present invention, the attribute information is the content separability and the location adjustability. The processor is further configured to: before generating the to-be-posted information according to the attribute information of the at least two pieces of information and the operation instruction of the user for the at least two pieces of information, obtain the content separability and the location adjustability of the at least two pieces of information, to determine that the at least two pieces of information are content inseparable and location nonadjustable information. The output device is further configured to prompt, according to content separability and the location adjustability of the at least two pieces of information, the user that the at least two pieces of information are content inseparable and location nonadjustable information. The input device is specifically configured to receive an operation instruction of the user for the at least two pieces of content inseparable and location nonadjustable information. The processor is specifically configured to generate the to-be-posted information according to the operation instruction of the user for the at least two pieces of content inseparable and location nonadjustable information.

In an embodiment of the present invention, the attribute information is the content separability and the location adjustability. The processor is further configured to: before generating the to-be-posted information according to the attribute information of the at least two pieces of information and the operation instruction of the user for the at least two pieces of information, obtain the content separability and the location adjustability of the at least two pieces of information, to determine that the at least two pieces of information are content inseparable and location adjustable information. The output device is further configured to prompt, according to the content separability and the location adjustability of the at least two pieces of information, the user that the at least two pieces of information are content inseparable and location adjustable information. The input device is specifically configured to receive an operation instruction of the user for the at least two pieces of content inseparable and location adjustable information. The processor is specifically configured to generate the to-be-posted information according to the operation instruction of the user for the at least two pieces of content inseparable and location adjustable information.

In an embodiment of the present invention, the at least two pieces of information are at least two pieces of information included in one piece of combination information sent by the second client, and the identification information corresponding to the at least two pieces of information is identification information corresponding to the piece of combination information.

In an embodiment of the present invention, the receiver is specifically configured to receive the at least two pieces of information, the identification information corresponding to each piece of information in the at least two pieces of information, the first indication information corresponding to the at least two pieces of information, and the attribute information of the at least two pieces of information, where the foregoing information is sent by the second client by using a server. The transmitter is specifically configured to send, by using the server, the second client the to-be-posted information and the identification information and the second indication information corresponding to the to-be-posted information.

In an embodiment of the present invention, the processor is further configured to: before the transmitter sends the second client the to-be-posted information and the identification information and the second indication information corresponding to the to-be-posted information, determine attribute information of the to-be-posted information according to a setting instruction of the user for the attribute information of the to-be-posted information; or the processor is further configured to set attribute information of the to-be-posted information according to a preset rule. The transmitter is specifically configured to send the second client the to-be-posted information, the identification information and the second indication information corresponding to the to-be-posted information, and the attribute information of the to-be-posted information.

It should be noted that in the foregoing embodiments of the present invention, for the foregoing same or corresponding technical features, reference may be made to each other. The embodiments of the present invention may include various combinations of the foregoing technical features.

The foregoing embodiments are merely intended for describing the technical solutions of the present invention, but not for limiting the present invention. Although the present invention is described in detail with reference to the foregoing embodiments, persons of ordinary skill in the art should understand that they may still make modifications to the technical solutions described in the foregoing embodiments or make equivalent replacements to some technical features thereof, without departing from the scope of the technical solutions of the embodiments of the present invention.

What is claimed is:

1. An information transfer method, comprising:
sending, by a client, a data obtaining request to a server, wherein the data obtaining request is used to obtain information associated with a user account of the client;
receiving, by the client, N pieces of information and N pieces of corresponding identification information sent by the server according to the data obtaining request, wherein the N pieces of identification information are used to respectively and uniquely identify the N pieces of information in a system that comprises the client and the server, and N is an integer greater than or equal to 2;
when an $i^{th}$ piece of information in the N pieces of information is combination information that comprises multiple pieces of information, presenting, by the client according to first indication information corresponding to the $i^{th}$ piece of information, the multiple pieces of information comprised in the $i^{th}$ piece of information, wherein the first indication information is used to indicate a relative location relationship among the multiple pieces of information comprised in the $i^{th}$ piece of information when the multiple pieces of information comprised in the $i^{th}$ piece of information are being presented, and i is an integer greater than or equal to 1 and less than or equal to N, or
when the $i^{th}$ piece of information in the N pieces of information is non-combination information, presenting, by the client, the $i^{th}$ piece of information;
obtaining, by the client, attribute information of at least two pieces of information in the N pieces of information, wherein the attribute information comprises at least one of content separability or location adjustability;
generating, by the client, to-be-posted information according to the attribute information of the at least two pieces of information and an operation instruction of a user for the at least two pieces of information, wherein the to-be-posted information is information obtained by the user by editing the at least two pieces of information according to the attribute information of the at least two pieces of information; and
determining, by the client, identification information corresponding to the to-be-posted information and second indication information corresponding to the to-be-posted information, and sending the server the identification information and the second indication information of corresponding to the to-be-posted information.

2. The method according to claim 1, wherein:
the attribute information comprises the content separability;
obtaining, by the client, the attribute information of at least two pieces of information in the N pieces of information comprises:
obtaining, by the client, the content separability of the at least two pieces of information in the N pieces of information, to determine that the at least two pieces of information are content inseparable information; and
generating, by the client, the to-be-posted information according to the attribute information of the at least two pieces of information and an operation instruction of a user for the at least two pieces of information comprises:
prompting, by the client according to the content separability of the at least two pieces of information, the user that the at least two pieces of information are content inseparable information, and
receiving, by the client, an operation instruction of the user for the at least two pieces of content inseparable information, and generating the to-be-posted information.

3. The method according to claim 1, wherein:
the attribute information comprises the location adjustability;
obtaining, by the client, the attribute information of at least two pieces of information in the N pieces of information comprises:
obtaining, by the client, the location adjustability of the at least two pieces of information in the N pieces of information, to determine that the at least two pieces of information are location nonadjustable information; and
generating, by the client, the to-be-posted information according to the attribute information of the at least two pieces of information and an operation instruction of a user for at least two pieces of information in the $i^{th}$ piece of information comprises:
prompting, by the client according to the location adjustability of the at least two pieces of information, the user that the at least two pieces of information are location nonadjustable information, and
receiving, by the client, an operation instruction of the user for the at least two pieces of location nonadjustable information, and generating the to-be-posted information.

4. The method according to claim 1, wherein:
the attribute information comprises the content separability and the location adjustability;
obtaining, by the client, the attribute information of at least two pieces of information in the N pieces of information comprises:
  obtaining, by the client, the content separability and the location adjustability of the at least two pieces of information in the N pieces of information, to determine that the at least two pieces of information are content separable and location nonadjustable information; and
generating, by the client, to-be-posted information according to the attribute information of the at least two pieces of information and an operation instruction of a user for at least two pieces of information in the $i^{th}$ piece of information comprises:
  prompting, by the client according to the content separability and the location adjustability of the at least two pieces of information, the user that the at least two pieces of information are content separable and location nonadjustable information, and
  receiving, by the client, an operation instruction of the user for the at least two pieces of content separable and location nonadjustable information, and generating the to-be-posted information.

5. The method according to claim 1, wherein:
the attribute information comprises the content separability and the location adjustability;
obtaining, by the client, the attribute information of at least two pieces of information in the N pieces of information comprises:
  obtaining, by the client, the content separability and the location adjustability of the at least two pieces of information in the N pieces of information, to determine that the at least two pieces of information are content inseparable and location nonadjustable information; and
generating, by the client, the to-be-posted information according to the attribute information of the at least two pieces of information and an operation instruction of a user for at least two pieces of information in the $i^{th}$ piece of information comprises:
  prompting, by the client according to the content separability and the location adjustability of the at least two pieces of information, the user that the at least two pieces of information are content inseparable and location nonadjustable information, and
  receiving, by the client, an operation instruction of the user for the at least two pieces of content inseparable and location nonadjustable information, and generating the to-be-posted information.

6. The method according to claim 1, wherein:
the attribute information comprises the content separability and the location adjustability;
obtaining, by the client, the attribute information of at least two pieces of information in the N pieces of information comprises:
  obtaining, by the client, the content separability and the location adjustability of the at least two pieces of information in the N pieces of information, to determine that the at least two pieces of information are content inseparable and location adjustable information; and
generating, by the client, the to-be-posted information according to the attribute information of the at least two pieces of information and an operation instruction of a user for at least two pieces of information in the $i^{th}$ piece of information comprises:
  prompting, by the client according to the content separability and the location adjustability of the at least two pieces of information, the user that the at least two pieces of information are content inseparable and location adjustable information, and
  receiving, by the client, an operation instruction of the user for the at least two pieces of content inseparable and location adjustable information, and generating the to-be-posted information.

7. The method according to claim 1, wherein at least one piece of information in the at least two pieces of information is combination information that comprises multiple pieces of information.

8. The method according to claim 1, wherein:
the $i^{th}$ piece of information in the N pieces of information is combination information that comprises multiple pieces of information;
obtaining, by the client, the attribute information of at least two pieces of information in the N pieces of information comprises:
  obtaining, by the client, attribute information of at least two pieces of information in the $i^{th}$ piece of information; and
generating, by the client, the to-be-posted information according to the attribute information of the at least two pieces of information and an operation instruction of a user for the at least two pieces of information comprises:
  generating, by the client, to-be-posted information according to the attribute information of the at least two pieces of information and an operation instruction of the user for the at least two pieces of information in the $i^{th}$ piece of information, wherein the to-be-posted information is information obtained by the user by editing the at least two pieces of information in the $i^{th}$ piece of information according to the attribute information of the at least two pieces of information.

9. The method according to claim 8, wherein the at least two pieces of information in the $i^{th}$ piece of information are all information comprised in the $i^{th}$ piece of information.

10. The method according to claim 1, wherein before sending the server the identification information and the second indication information corresponding to the to-be-posted information, the method further comprises:
  obtaining, by the client, a setting instruction of the user for attribute information of the to-be-posted information, and determining the attribute information of the to-be-posted information; or
  setting, by the client, attribute information of the to-be-posted information according to a preset rule; and
  sending the server the identification information and the second indication information corresponding to the to-be-posted information comprises:
    sending the server the identification information and the second indication information corresponding to the to-be-posted information and the attribute information of the to-be-posted information.

11. A client, wherein the client comprises:
a transmitter;
a receiver;
a processor;
an output device; and
an input device;

wherein the transmitter is connected to the processor, the receiver is connected to the processor, the output device is connected to the processor, and the input device is connected to the processor; wherein:
the transmitter is configured to send a data obtaining request to a server, wherein the data obtaining request is used to obtain information associated with a user account of the client;
the receiver is configured to receive N pieces of information and N pieces of corresponding identification information sent by the server according to the data obtaining request, wherein the N pieces of identification information are used to respectively and uniquely identify the N pieces of information in a system that comprises the client and the server, and N is an integer greater than or equal to 2;
the output device is configured to:
when the $i^{th}$ piece of information in the N pieces of information is combination information that comprises multiple pieces of information, present, according to first indication information corresponding to the $i^{th}$ piece of information, the multiple pieces of information comprised in the $i^{th}$ piece of information, wherein the first indication information is used to indicate a relative location relationship among the multiple pieces of information comprised in the $i^{th}$ piece of information when the multiple pieces of information comprised in the $i^{th}$ piece of information are being presented, or
when the $i^{th}$ piece of information in the N pieces of information is non-combination information, present the $i^{th}$ piece of information, wherein i is an integer greater than or equal to 1 and less than or equal to N;
the processor is configured to obtain attribute information of at least two pieces of information in the N pieces of information, wherein the attribute information comprises at least one of the following attributes of the at least two pieces of information: content separability or location adjustability;
the input device is configured to obtain an operation instruction of a user for the at least two pieces of information;
the processor is further configured to:
generate to-be-posted information according to the attribute information of the at least two pieces of information and the operation instruction of the user for the at least two pieces of information, wherein the to-be-posted information is information obtained by the user by editing the at least two pieces of information according to the attribute information of the at least two pieces of information, and
determine identification information corresponding to the to-be-posted information and second indication information corresponding to the to-be-posted information; and
the transmitter is further configured to:
after the processor determines the identification information corresponding to the to-be-posted information and the second indication information corresponding to the to-be-posted information, send the server the identification information and the second indication information corresponding to the to-be-posted information.

12. The client according to claim 11, wherein:
the attribute information comprises the content separability;
the processor is further configured to obtain the content separability of the at least two pieces of information in the N pieces of information, to determine that the at least two pieces of information are content inseparable information;
the output device is further configured to:
when the processor determines that the at least two pieces of information are content inseparable information, prompt the user that the at least two pieces of information are content inseparable information;
the input device is further configured to receive an operation instruction of the user for the at least two pieces of content inseparable information; and
the processor is further configured to generate the to-be-posted information according to the operation instruction that is of the user for the at least two pieces of content inseparable information and is received by the input device.

13. The client according to claim 11, wherein:
the attribute information comprises the location adjustability;
the processor is further configured to obtain the location adjustability of the at least two pieces of information in the N pieces of information, to determine that the at least two pieces of information are location nonadjustable information;
the output device is further configured to:
when the processor determines that the at least two pieces of information are location nonadjustable information, prompt the user that the at least two pieces of information are location nonadjustable information;
the input device is further configured to receive an operation instruction of the user for the at least two pieces of location nonadjustable information; and
the processor is further configured to generate the to-be-posted information according to the operation instruction that is of the user for the at least two pieces of location nonadjustable information and is received by the input device.

14. The client according to claim 11, wherein:
the attribute information comprises the content separability and the location adjustability;
the processor is further configured to obtain the content separability and the location adjustability of the at least two pieces of information in the N pieces of information, to determine that the at least two pieces of information are content separable and location nonadjustable information;
the output device is further configured to:
when the processor determines that the at least two pieces of information are content separable and location nonadjustable information, prompt the user that the at least two pieces of information are content separable and location nonadjustable information;
the input device is further configured to receive an operation instruction of the user for the at least two pieces of content separable and location nonadjustable information; and
the processor is further configured to generate the to-be-posted information according to the operation instruction that is of the user for the at least two pieces of content separable and location nonadjustable information and is received by the input device.

15. The client according to claim 11, wherein:
the attribute information comprises the content separability and the location adjustability;
the processor is further configured to obtain the content separability and the location adjustability of the at least two pieces of information in the N pieces of information, to determine that the at least two pieces of information are content inseparable and location nonadjustable information;
the output device is further configured to:
when the processor determines that the at least two pieces of information are content inseparable and location nonadjustable information, prompt the user that the at least two pieces of information are content inseparable and location nonadjustable information;
the input device is further configured to receive an operation instruction of the user for the at least two pieces of content inseparable and location nonadjustable information; and
the processor is further configured to generate the to-be-posted information according to the operation instruction that is of the user for the at least two pieces of content inseparable and location nonadjustable information and is received by the input device.

16. The client according to claim 11, wherein:
the attribute information comprises the content separability and the location adjustability;
the processor is further configured to obtain the content separability and the location adjustability of the at least two pieces of information in the N pieces of information, to determine that the at least two pieces of information are content inseparable and location adjustable information;
the output device is further configured to:
when the processor determines that the at least two pieces of information are content inseparable and location adjustable information, prompt the user that the at least two pieces of information are content inseparable and location adjustable information;
the input device is further configured to receive an operation instruction of the user for the at least two pieces of content inseparable and location adjustable information; and
the processor is further configured to generate the to-be-posted information according to the operation instruction that is of the user for the at least two pieces of content inseparable and location adjustable information and is received by the input device.

17. The client according to claim 11, wherein at least one piece of information in the at least two pieces of information is combination information that comprises multiple pieces of information.

18. The client according to claim 11, wherein:
the $i^{th}$ piece of information in the N pieces of information is combination information that comprises multiple pieces of information; and
the processor is further configured to:
obtain attribute information of at least two pieces of information in the $i^{th}$ piece of information, and generate to-be-posted information according to the attribute information of the at least two pieces of information and an operation instruction of the user for the at least two pieces of information in the $i^{th}$ piece of information.

19. The client according to claim 18, wherein the at least two pieces of information in the $i^{th}$ piece of information are all information comprised in the $i^{th}$ piece of information.

20. The client according to claim 11, wherein:
the processor is further configured to:
before the transmitter sends the server the identification information and the second indication information corresponding to the to-be-posted information, determine attribute information of the to-be-posted information according to a setting instruction of the user for the attribute information of the to-be-posted information, or
set attribute information of the to-be-posted information according to a preset rule; and
the transmitter is further configured to send the server the identification information and the second indication information corresponding to the to-be-posted information and the attribute information of the to-be-posted information.

* * * * *